(12) United States Patent
Kotab

(10) Patent No.: US 9,949,093 B2
(45) Date of Patent: Apr. 17, 2018

(54) SYSTEM, METHOD, AND COMPUTER PROGRAM PRODUCT FOR MANAGING A NETWORK BASED ON FEEDBACK

(71) Applicant: Dominic M. Kotab, San Jose, CA (US)

(72) Inventor: Dominic M. Kotab, San Jose, CA (US)

(73) Assignee: Dominic M. Kotab, San Jose, CA (US)

( * ) Notice: Subject to any disclaimer, the term of this patent is extended or adjusted under 35 U.S.C. 154(b) by 0 days.

(21) Appl. No.: 15/011,223

(22) Filed: Jan. 29, 2016

(65) Prior Publication Data

US 2016/0227017 A1 Aug. 4, 2016

Related U.S. Application Data

(60) Provisional application No. 62/109,572, filed on Jan. 29, 2015.

(51) Int. Cl.
| | |
|---|---|
| *H04B 7/00* | (2006.01) |
| *H04W 4/04* | (2009.01) |
| *H04L 12/24* | (2006.01) |
| *H04W 84/20* | (2009.01) |
| *H04W 84/18* | (2009.01) |
| *H04W 8/00* | (2009.01) |
| *H04W 76/02* | (2009.01) |
| *H04W 84/12* | (2009.01) |
| *H04W 4/00* | (2018.01) |
| *H04M 1/725* | (2006.01) |

(52) U.S. Cl.
CPC ............ *H04W 4/046* (2013.01); *H04L 41/00* (2013.01); *H04L 41/30* (2013.01); *H04M 1/7253* (2013.01); *H04M 2250/06* (2013.01); *H04W 4/008* (2013.01); *H04W 8/005* (2013.01); *H04W 76/023* (2013.01); *H04W 84/12* (2013.01); *H04W 84/18* (2013.01); *H04W 84/20* (2013.01)

(58) Field of Classification Search
CPC ... H04W 84/12; H04W 76/023; H04W 8/005; H04W 84/18; H04W 4/008
USPC .................................... 455/41.1, 422.1, 431
See application file for complete search history.

(56) References Cited

U.S. PATENT DOCUMENTS

| | | | |
|---|---|---|---|
| 9,148,473 B1 * | 9/2015 | Sharma | H04L 67/10 |
| 2003/0037125 A1 * | 2/2003 | Luman | H04W 16/00 709/220 |
| 2003/0109273 A1 * | 6/2003 | Ono | H04W 84/02 455/517 |
| 2007/0146127 A1 * | 6/2007 | Stilp | G08B 1/08 340/531 |
| 2007/0223398 A1 * | 9/2007 | Luo | H04W 4/08 370/254 |
| 2013/0204943 A1 * | 8/2013 | Ricci | G06F 3/0484 709/204 |
| 2015/0038090 A1 * | 2/2015 | Chang | G07C 9/00111 455/66.1 |

(Continued)

*Primary Examiner* — Charles Appiah
*Assistant Examiner* — Jaime Holliday
(74) *Attorney, Agent, or Firm* — Zilka-Kotab, P.C.

(57) ABSTRACT

A system, method, and computer program product are provided for managing a network based on feedback according to one embodiment. In use, the method includes establishing a network, and connecting at least one device to the network. Additionally, the method includes receiving feedback from the at least one device. Lastly, the network is managed based on the feedback form the at least one device. Additional systems, methods, and computer program products are also presented.

22 Claims, 16 Drawing Sheets

(56) References Cited

U.S. PATENT DOCUMENTS

2016/0043962 A1* 2/2016 Kim ..................... H04W 4/008
 709/224

* cited by examiner

SYSTEM, METHOD, AND COMPUTER PROGRAM PRODUCT FOR MANAGING A NETWORK BASED ON FEEDBACK

FIELD OF THE INVENTION

The present invention relates to managing a network, and more particularly, this invention relates to managing a network based on feedback from one or more devices.

BACKGROUND

Network management of devices is commonly used. For example, a network system may include a permission list of permitted devices or prohibited devices. Additionally, a network may permit or exclude users. However, modern network systems lack the ability to dynamically change based on feedback from one or more device.

There is thus a need for addressing these and/or other issues and voids associated with the prior art.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses various preferred embodiments. It should be noted that the various examples presented herein are in no way intended to limit the invention, but rather have been presented to provide further description to various embodiments described and/or suggested herein.

Figure 1:
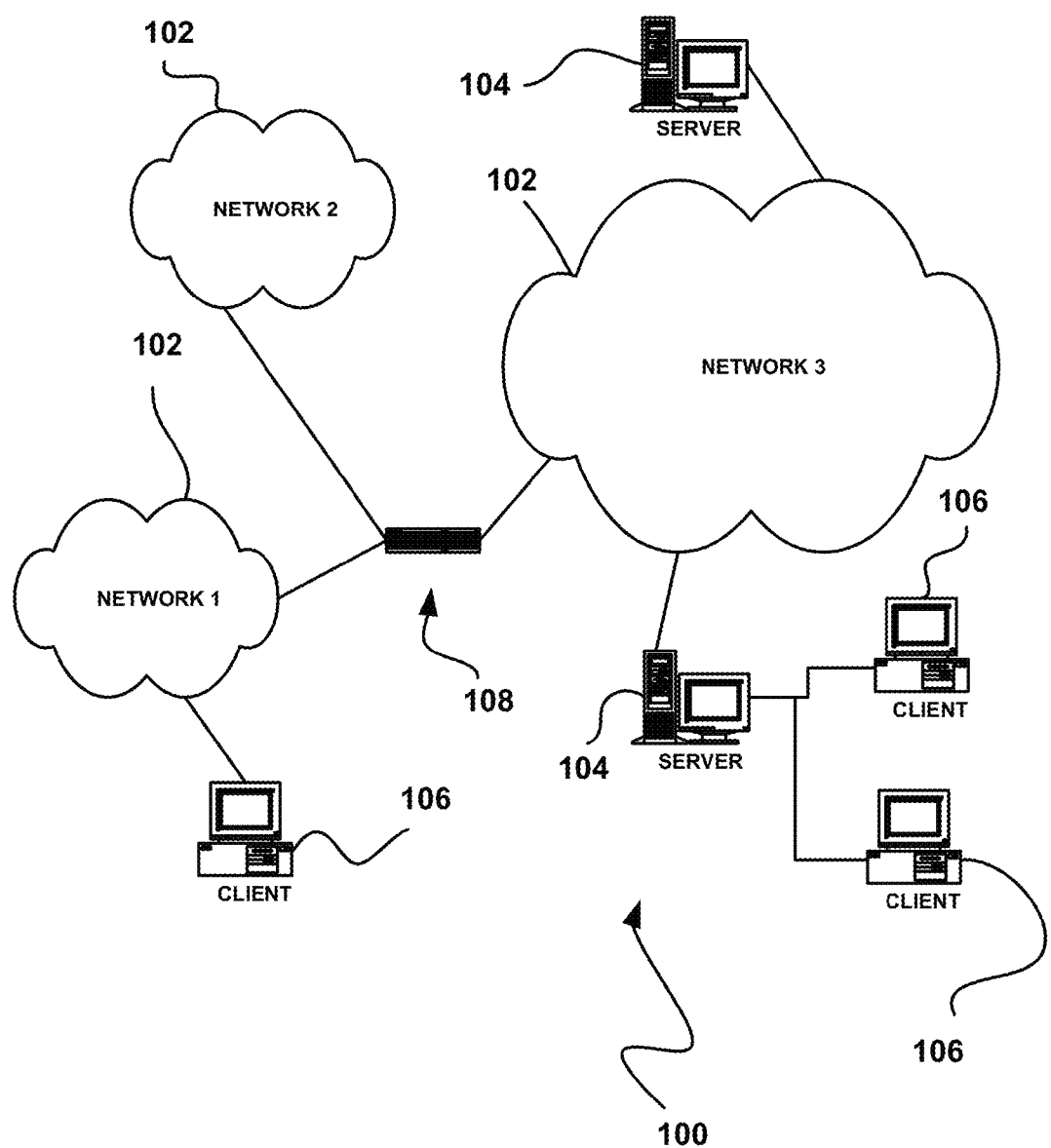
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to, a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
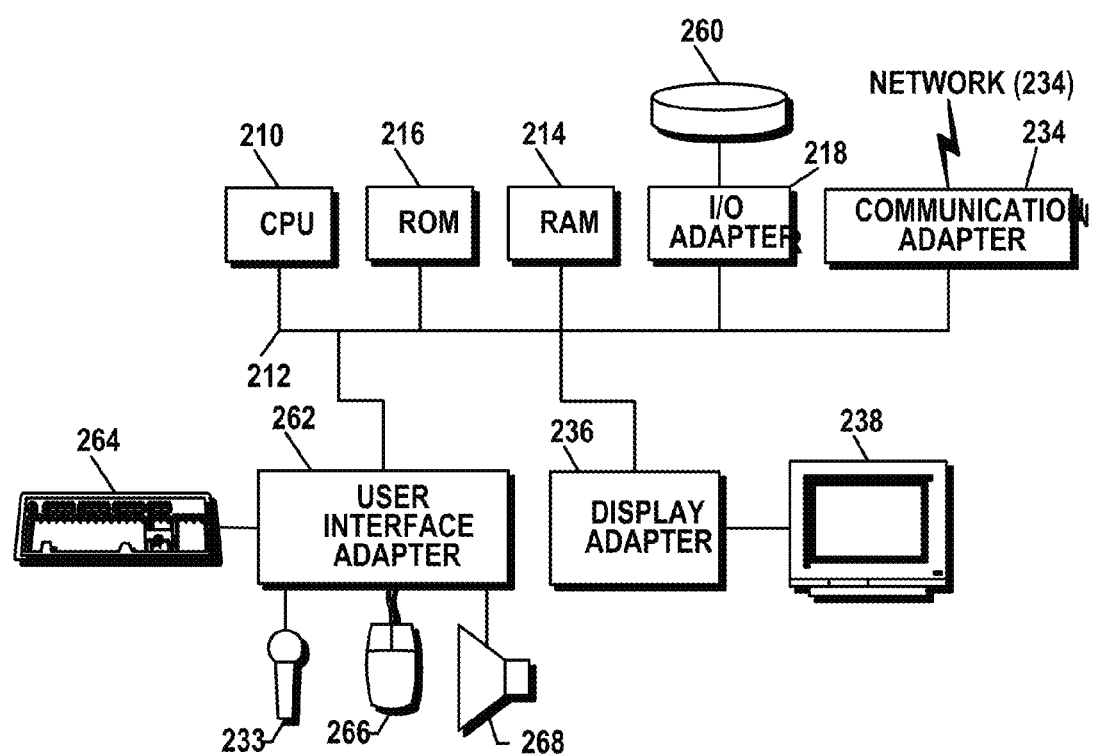
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. However, such network architecture 100 and others presented herein may be used in various applications and/or in permutations which may or may not be specifically described in the illustrative embodiments listed herein. Further, the network architecture 100 presented herein may be used in any desired environment.

As shown, a system 200 is provided including a processing circuit, referred to generally herein as a "processor" and intended to encompass any component or group of cooperating components that enable any of the embodiments herein. The processing circuit may include at least one central processor 201 which is connected to a communication bus 202. The system 200 also includes main memory 204 [e.g., random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 204 and/or the secondary storage 210. Such computer programs, when executed, enable the system 200 to perform various functions (to be set forth below, for example). Memory 204, storage 210 and/or any other storage are possible examples of computer-readable media.

Figure 3:
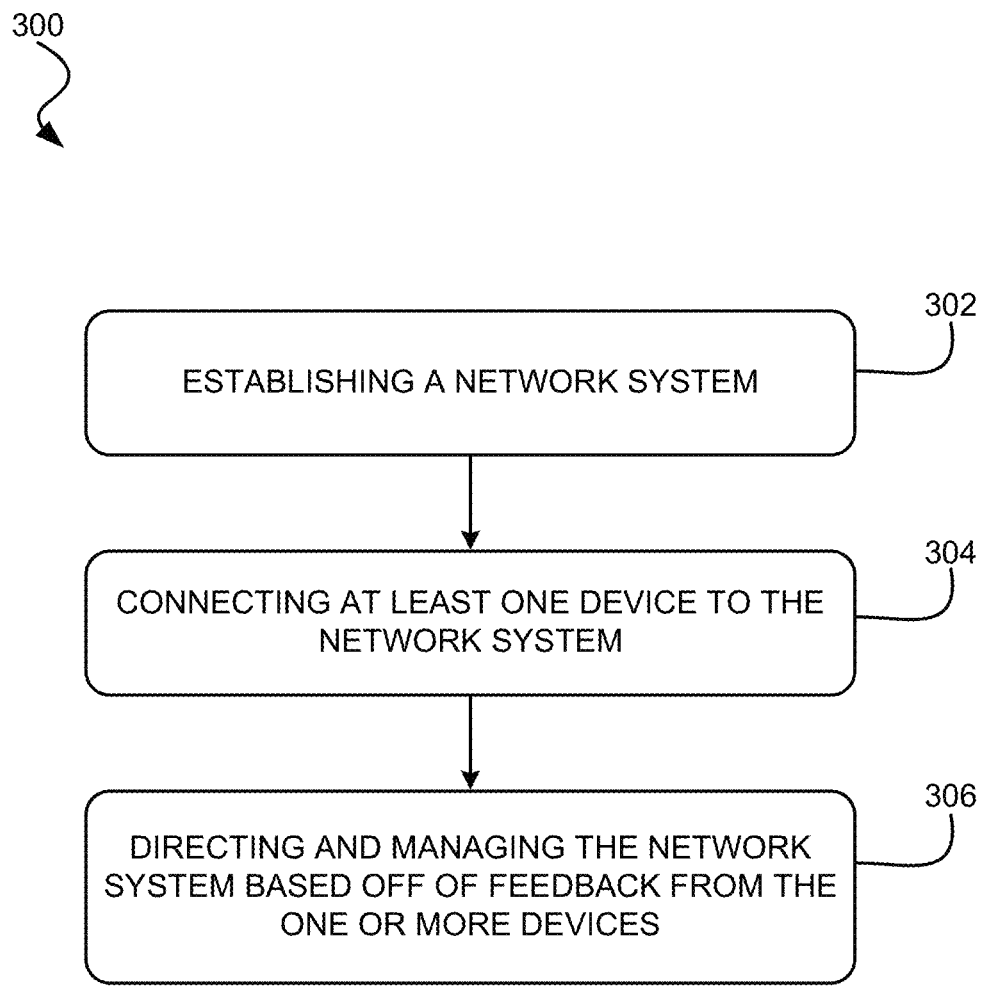
FIG. 3 shows a method for managing a network system, in accordance with one embodiment.

Now referring to FIG. 3, a flowchart of a method 300 for directing and managing a network system is shown according to one embodiment. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art. Further, the aforementioned definitions may equally apply to the description below.

As shown, a network system is established. See operation 302. Additionally, one or more devices may be connected to the network system. See operation 304. Feedback is preferably received from the one or more devices connected to the network system. Further, the network system may be directed and/or managed based off of feedback received from the one or more devices. In the context of the present description, feedback refers to information and/or commands received from and/or about devices. See operation 306. Although not shown in FIG. 3, method 300 may further include designating at least one of the devices as a master device, and designating at least one of the devices as a slave device. The master device preferably has control over the slave device. Moreover, the master device may have control over at least a portion of the network, e.g., as described in further detail below.

In the context of the present description, a network system may refer to any system of devices connected to a network. In one embodiment, the network may be established using (e.g., through) a wired connection. For example, in various embodiments, the wired connection may include an Ethernet connection, a plug and play connection (e.g., USB, etc.), a proprietary connection (e.g., Apple iPhone, etc.), etc., and/or any other connection which includes a wired interface.

In some approaches, managing the network may include adjusting settings associated with the network and/or the connection of the one or more devices to the network. For example, managing the network may include increasing or decreasing the number of devices connected to the network, designating a different device as a master device, demoting a master device to a slave device, re-designating at least one of the slave device as a second master device, etc., or any adjusting any other settings associated with the network and/or the connection of the one or more devices to the network.

As alluded to above, method 300 may be implemented by a controller, a computer program product, processor, etc., depending on the desired embodiment. Moreover, in some approaches, the controller, computer program product, processor, etc. implementing method 300 may be physically integrated with a given environment. Moreover, the devices connected to the network established in method 300 may be in proximity to the given environment, e.g., close enough to the environment to connect to the network. According to different in-use embodiments which are in no way intended to limit the invention, the environment may be automobile, a room, a building, etc. Thus, in one embodiment, the component implementing method 300 (e.g., controller, computer program product, processor, etc.) may be physically integrated with an automobile. With reference to the present description, "physically integrated with" is intended to include any way of at least semi-permanently coupling the component to the automobile, e.g., using fasteners, adhesives, channels, rivets, welding, soldering, etc., in comparison to a component which is readily removable, e.g., such as a device coupled to a windshield using a suction-cup. However, in some approaches the component implementing method 300 may be readily removable from the automobile (e.g., environment), e.g., such that the component may be easily exchanged between automobiles, implemented in new (e.g., unexpected) environments, easily replaced, etc.

In some embodiments, the network may be established using (e.g., through) a wireless connection. For example, in various embodiments the wireless connections may include a WiFi connection, a Bluetooth connection, data connections (e.g., 4G, 3G etc.), etc., and/or any other network connection which utilizes a wireless interface. Known components may be adapted for use in the various embodiments to provide aspects of the network connectivity.

Further, in another embodiment, the network may be established by creating a connection between two or more devices. In the context of the present description, a device may include any physical entity which is capable of connecting to a network. For example, the first device requests (or receives a request) that a network be established with one or more devices which would enable those connected devices to communicate, share and access information, optimize data transfer and/or usage, etc. According to different approaches, this network may be wired or wireless.

In still another embodiment, the network may be established through one or more existing network systems. For example, in one approach, a first device may broadcast a first local network system which can then be leveraged and shared with one or more other devices. More specifically, the first local network system may be setup initially through the first device to allow the first device to connect to resources (e.g., photos, music, etc.) located in one or more other devices.

In a separate embodiment, a network may be established which could deny users within the network access to external resources/networks (e.g., WiFi connections, data connections etc.). In the context of the present description, external resources refer to any source or supply asset outside of the network system which may be utilized by the network and/or one or more devices on the network. For example, in various embodiments, if one or more devices create a network, that network may be comprised such that any device on the network could communicate and share information with one or more other devices on the network but may not access available external resources (e.g., no transfer of information outside of the network).

Additionally, in one embodiment, the network may be established automatically. For example, in various embodiments, if one or more compatible devices are detected within range (e.g., predetermined range or maximum range of primary device/one or more devices on the network, etc.) a network of flexible design/interface will automatically be created such that automatic adaptations may be made to enhance the capacity of the network (e.g., connectivity of the devices, paths of communication, modes of data/information transfer etc.). More specifically, in various embodiments, the network may establish optimum speed and connectivity adaptable to the abilities of the devices connected.

In another embodiment, the network may be established manually. For example, in one embodiment, a master device may control how and/or when one or more devices are connected to the network and to each other based on the input of a user controlling the master device, and/or by some hierarchy associated with one or more master devices. For example, in various embodiments, if one or more devices on the network desired to connect it may require the compliance (e.g., approval, white-list permission, etc.) of the master device user. Further, the interface of the system may be adapted manually to optimize usage. For example, optimizing usage may be manually controlled by the master device as it may control and/or limit the number of users on the network at any given time. In addition, the master device may alter or manage the usage and/or connection to external networks.

Still yet, in another embodiment, the network may be manually controlled by an individual device. For example, in one embodiment, all devices may be independent on the network (i.e. not otherwise associated with each other, etc.) yet may require manual control in order to change or adapt the connectivity, interface, and/or compatibility of the connected devices. Additionally, in a further embodiment, in order to change or adapt the connectivity, interface, or computability, a set threshold of devices preferably give permission (or a global master device) to the seeking device in order to effect the change.

In one embodiment, the network may be established permanently. For example, a device (e.g., a car, stationary computer, train, etc.) may constantly have a network interface available for one or more devices to enter. This type of device may be permanently installed as an integrated part of a larger system (e.g., the entertainment system of a car, etc.) or be a stand-alone/additional feature. Further, in one embodiment, the network may be created between devices (e.g., not all directly connected to the main device) in order to assure optimum usability.

Additionally, in one embodiment, the ability to connect to the network may be manually controlled by one or more master devices. For example, in one embodiment, if one or more devices attempts to connect to the network, admittance may be required by manual consent of the user controlling the master device. Further, in various embodiments, consent to connect may be programmed into the network and/or master device and thus granted automatically by the system upon request from the user of one or more devices.

Further, in one embodiment, the connectivity of one or more devices may occur manually. For example, if one or more devices wishes to connect to the network, access may be granted manually by one or more users already connected to the network. Further, this may occur each time a device attempts to connect to the network, after a device has been disconnected from the network for an amount of time, after a device has attempted to connect to the network a certain number of times, etc.

Additionally, in another embodiment, the ability to connect to the network may require approval any time one or more devices wish to connect regardless of previous attempts or successes. For example, in one embodiment if one or more devices have never connected to the network, approval for access may be required. Further, in another embodiment, if one or more devices request to connect to the network and have previously connected, approval (e.g., consent) may still be required.

Yet, in another embodiment, the connection of one or more devices may occur manually only the first time the device connects to the network, and thereafter the one or more devices may be granted access without reserve. For example, if one or more devices have previously been granted access to, and have connected to the network system, a request to regain access may be granted without consent required from the master device(s) or another user on the network at any time after the original attempt to connect to the network.

In various embodiments, in order for to connect to or within the network it may require a request to be sent to a user on the network and approval given from that user. For example, in various embodiments, if one or more devices encounters the network a request may be sent in order to be granted access to the network. In addition, in another embodiment, if a user already within the network desires to make a connection with one or more other users already within the network, a request may be sent for connection and in order for the connection to be made the users may be required to grant the request. In the context of the present description, a user refers to a third party who is currently connected to or has in the past been connected to the network system.

Further, in one embodiment, the connection of one or more devices may occur automatically. For example, if one or more devices are detected within range of the network a connection may be automatically established and adapted in order to allow access for that device as well as optimize the usability of the network.

Additionally, in another embodiment, the network may seek out others to connect to the network. For example, in various embodiments, the network may search for one or more devices within range of the network and send a request to connect. Further, the connection may occur only with permission of the device or it may occur automatically without consent. In the context of the present description, the term 'seek out' refers to the ability of the network and/or users on the network to recognize devices within range which are not currently connected to the network system.

In various embodiments, the connection or disconnection of devices may occur based on optimization of the network. For example, in one embodiment, the network may be established such that one or more devices may connect only if they will contribute to enhancing the network due to personal resources (e.g., other network connections [e.g., data, WiFi, etc.], information, processing ability etc.). Further, in one embodiment, one or more devices may be allowed to remain on the network so long as they continue to contribute to the network.

Still yet, in one embodiment, the master device may control the connection of one or more devices to the network. For example, in various embodiments, if one or more devices sends a request to connect to the network it may be approved or denied by the master device(s).

Further, in another embodiment, the connection of one or more devices may not be affected by the master device. For example, in various embodiments, the master device may set up the network and may adapt it as needed but may not control the connection of one or more devices.

Additionally, in another embodiment, the network may only allow specific devices to connect. For example, in various embodiments the network may be established such that only specific devices (e.g., a predetermined/complied list of devices) have access to the network and may connect. This connection may occur manually or automatically according to any of the approaches described herein.

In a separate embodiment, there may be a predetermined number of devices that may connect to the network. For example, in various embodiments upon establishing the network, or at any time during functionality, a limit may be set on the number of devices that constitute the network. The limit may be predetermined, set by a user, calculated in real time, etc., depending on the types of devices connecting to the network, the type of network, user preference, available power levels, signal strength, connection types, etc.

Further, the network may allow that number to change based on input from the master devices or one or more other devices authorized to make changes to the network. According to other approaches, the number of devices that may connect to the network may vary depending on characteristics of the network. For example, the number of devices that may connect to the network may be increased in response to detecting a high number of connection requests received, e.g., by a master device. According to another approach, the number of devices that may connect to the network may be reduced in response to determining that the amount of processing power available is below a threshold. In still other approaches, the number of devices that may connect to the network may vary depending on the types of devices requesting the connection, user preference, the performance of background operations, available power levels, signal strength, connection type, etc.

In various embodiments, there may be no limit to the number of devices allowed on the network. For example, in one embodiment, at any time one or more devices may connect to the network thus facilitating the range and functionality of the network. Further, the network may be established such that no limit of devices may ever be placed upon the network.

Further, some embodiments, one or more devices on the network may connect to other networks/devices in order to increase the speed and efficiency of the network. For example, a device on the network (e.g., a computer, car, etc.) may connect to an outside resource (e.g., Internet, 4G, Ethernet, etc.), thus facilitating the functionality of the network. Further, this may occur automatically and/or manually by one or more devices associated with the network.

In another embodiment, the network may be managed by a master device. For example, in one embodiment the device which initiates the network may be designated as the master device. Moreover, all other devices associated with the network may be designated as slave devices, e.g., having limited access and/or capability within the network system. Further, the master device may have the ability to manipulate or alter the network and/or connections of one or more devices (e.g., slave devices), e.g., depending on the desired embodiment.

Additionally, another embodiment may include multiple master devices. For example, if one or more master devices are desired, e.g., in order in increase the efficiency of the network, the network may allow for more than one master device to be present in the network. This may be implemented, for example, by granting the abilities of a master device to another device, e.g., which may have previously been a slave device.

In some embodiments, the one or more master devices may change between one or more devices in the network. For example, it may be established that the device with the greatest available external resources is the master device. Thus as one or more devices connect to the network the master device may change as a result of new users on the network system having greater available external resources than the existing master device. Further, the master device may allocate, either partially and/or entirely, the master device capabilities to one or more other devices.

In yet another embodiment, the number of master devices may increase to support the increasing number of devices on the network. For example, as one or more devices are connected to the network additional devices with master devices capacities may be desired. Further, this allotment of additional master devices may be performed automatically by the network and/or manually by one or more of the current master devices.

In some embodiments, the slave devices may have one or more limitations. For example, when a device connects to a network having a master-slave relationship implemented therewith, the new device may or may not have the capability to alter the network in one or more specific manners (e.g., allowing and/or denying access to other users, manipulating resource availability between devices, etc.). Thus, some slave devices may be restricted from performing certain processes, e.g., based on the slave devices' abilities and/or limitations.

In another embodiment, a hierarchy may exist among one or more of the devices. In one approach, if a master device allocates master device functions to one or more devices, then the master device which allocated the functions may be able to remove the granted abilities (e.g., status) from the newly allocated master devices, but not vice versa. In other approaches, the newly allocated master devices may require consent from the original master device in order to alter the network in certain ways (e.g., to abolish the network, allocation of master capabilities to other devices, etc.).

Additionally, in one embodiment, the connection of one or more devices may be limited to a specified amount of time. For example, in one embodiment one or more devices may connect to the network, but after a given amount of time, one or more of the devices may automatically be denied continued access to the network and its resources. These one or more devices may not be able to reconnect to the network without consent of one or more other devices having continued access to the network. In some approaches, a device assigned as a master device may be exempt from such network timeout provisions. Thus, a master device may only be denied continued access to the network and its resources resulting from a user request, being demoted to a slave device, upon meeting a different condition, etc.

In some embodiments, the unused resources of each device on the network may be put to use (e.g., used), either directly or indirectly, by other devices on the network. For example, if one or more devices on the network have resources available (e.g., Internet, data connection, etc.) that are either fully or partially unused, they may be requested for use by one or more other devices on the network. Further, in a separate embodiment if one or more devices demand full usage of its outside resources it may take preference over the one or more other devices requests to utilize the resource.

Still yet, in one embodiment, the network may be invisible from devices not connected. In the context of the present description, the term 'invisible' refers to a state where the network cannot be detected (either automatically or manually) by one or more devices outside the network. For example, if one or more devices search for a network in order to make a connection, the network would not be found. Thus, in order to connect one or more devices to the network a device already connected may have to find one or more new devices (e.g., devices not already part of the established network) within range and allow then to connect. In the context of the present description, the term 'find' refers to the ability of the network and/or users on the network to recognize devices within range which are not currently connected to the network system.

In another embodiment, the network may always be visible to all devices within range. For example, in various embodiments if one or more devices are within range of the network they may automatically connect and/or request admittance to the network. In the context of the present description, the term 'visible' refers to a state where the network can be detected (either automatically or manually) by one or more devices outside the network.

Further, in another embodiment the network may be visible only to one or more selected devices. According to some approaches, upon creation (or anytime thereafter) the network may be constructed such that only specifically designated devices may find and connect to the network. According to an example, which is in no way intended to limit the invention, a device may be specifically designed such that it is tuned to detect signals at a specific frequency, e.g., which the network may use to connect to the device. Further, the list of devices may or may not be modified by one or more devices already connected to the network.

In addition, in various embodiments, the network may change from visible to invisible. Thus, if at any time the master device, creator of the network, permitted devices on the network, etc., desire to change the visibility function of the network it may be allotted. According to an example, it may be desirable that a network is changed to invisible for a period of time in response to determining that a maximum number of devices are connected to the network. This may alleviate the network from receiving continued connection requests from other devices attempting to connect to the network. Moreover, the network may be changed back to visible in response to one or more devices disconnecting from the network, thereby creating space for other devices to connect to the network.

Still yet, in one embodiment, the network may periodically self-analyze in order to reach optimum efficiency. In the context of the present description, the term 'self-analyze' preferably refers to the ability of the network system to evaluate some or all aspects of the system (e.g., either manually or automatically). In some approaches, the network may search to find one or more devices with resources that would benefit the network. Further, in other approaches, the network may establish, abolish, and/or modify connections between devices and/or the relationship between one or more devices and the network to increase speed, efficiency, etc. Still further, in some approaches the network may alter the number of devices on the network and/or devices which have master capabilities, e.g., as alluded to above.

In the context of the present description, media content may refer to any content which can be displayed. According to various approaches, photos (e.g., JPEG, TIFF, BMP, etc.), music (e.g., .mp3, radio stations, etc.), video files (e.g., .mp4, .avi, .mov, DVD, Blueray disks, etc.), etc., may be displayed. In other embodiments, media content may include interactive content. For example, a game may be played on one device with one or more players, or may be played on a plurality of devices with one or more players. As such, media content may refer to any type of content which may be displayed on a device.

In some embodiments, the data may not be stored on the device (e.g., it may be stored in a cloud based storage network, on another device, on external/network drive, etc.). In such an embodiment, the processing may occur at least in part on the processing device. For example, the processing device may access the data and process it in parts. In some approaches, the processing may occur in set partitions, or sections, based off of a storage amount (e.g., every 100 mb, etc.), time (e.g., every 25 min, etc.), etc., and/or any other feature. The processing device may process each set section and distribute the processed section to other devices (e.g., distribute device specific and optimized format, distribute package of optimized formats, etc.).

Further, in other embodiments, when the media content is not stored on the media device, the processing may occur on more than one device. For example, any device capable of processing the media content may optimize the content for the device. The media content file and/or data therefore may be accessed simultaneously by more than one device, processed by one or more of the devices, and then displayed on each device in an optimized manner. In the context of the present description, processing the media content may include rendering the media content in an optimized manner for the device display.

In this manner, media content may be retrieved by one or more devices. Additionally, media content may be streamed from a remote source to one or more devices, streamed from a local source (e.g., device, etc.) to one or more devices, streamed from any other location to a device and/or display, etc. In another embodiment, if media is being processed by individual devices, then part of the source media content file may be saved temporarily on the device. For example, a device buffer may be used to store part of the source media content, prior to the processing and/or displaying of the media content.

In a further embodiment, the device may be used to display the media content. According to one approach, the device may be incapable of processing the media content. For example, the device may function simply as a screen and/or display, the device may not be able to render and/or optimize media content, etc. Accordingly, the device may function solely to display media content, e.g., as received from another device from where the data may be streamed. In another embodiment, the device may be capable of processing the media content, but may only be used to display media content, e.g., as received from another device from where the data may be streamed. In this manner, media content may be displayed on one or more devices.

It should be noted that a "distribution channel" as used herein may refer to any network and/or device which is used to display the media content. For example, a distribution channel network may include a wireless system (e.g., WLAN, WiFi, WiFi direct, Bluetooth, etc.), a wired system (e.g., LAN, Ethernet, dock connector, etc.), etc., and/or any other network system which may be used to stream media content. In an illustrative approach, a distribution channel device may include any device which may be used to display the media content. As such, a distribution channel may refer to the protocol used to transmit the media content, and/or may refer to the endpoint where the media content is displayed.

According to an in-use embodiment which is in no way intended to limit the invention, a user may select the media content to be streamed. The user may then select a network to stream the media content with. Other devices on the network may then select to view the media content. In another embodiment, a user may select the media content to be streamed, and then select individual devices (e.g., the endpoints) to which the media content should be streamed. In yet another embodiment, the user may select the media content to be streamed, select the network to stream the content with, and then select the individual devices on the network to which the media content should be streamed.

In one embodiment, the media content may be pushed from a master device to one or more other devices (e.g., slave devices, etc.). According to some approaches, devices may be arranged via a hierarchy of permissions and/or settings, including, for example, detecting whether devices have been previously detected and/or categorized, detecting whether the devices belong to preconfigured user (e.g., if a user is parent or child, permissions may be automatically applied, etc.), detecting metadata associated with the device (e.g., a device ID, an active user, etc.), and/or detecting any other information which may influence whether the device should be classified as a master or slave device. If it was unknown whether devices have been previously detected and/or categorized, the device may assume a slave relationship unless changed by an administrator of the network, etc.

Additionally, in various embodiments, the allocation of hierarchal relationships may be determined and applied automatically. For example, the network system may be preconfigured to always designate user X1 as the master over any other device in NETWORK1. In various embodiments, the network system may be configured based off of a protocol and/or connection (e.g., WiFi, Bluetooth, WiFi Direct, cable connection, etc.). According to one approach, if X1 is predesignated as the master over NETWORK1, then no other device and/or user may function as a master in NETWORK1. Thus, if a non X1 device is detected in the network, it may be automatically designated as a slave device to a master X1 device on the network. However, in another approach, if a non X1 device is detected in the network, a user interface may be presented on the master X1 device requesting whether the non X1 device should be added in a slave relationship to the master X1 device. According to yet another approach, if a non X1 device is detected in the network, a user interface may be presented on the non X1 device, requested permission to be controlled by the master X1 device.

Limits may be placed on the control by the master X1 device. For example, the master X1 device may have permission to display media content on the non X1 device. However, the master X1 device may be prevented and/or limited from accessing content on the non X1 device, from altering information on the non X1 device, and/or using the non X1 device in any other manner.

Of course, in other embodiments, the non X1 device may be configured such that the master X1 device may have greater permissions and/or control of non X1 devices, including detecting and fetching media content from one or more non X1 devices, processing such media content, streaming such media content to one or more other devices (e.g., or displays, etc.), and/or using the non X1 devices in any other desired manner.

In one embodiment, if the detected non X1 device is identified for a first time, setup (e.g., pairing process, network identification, etc.) may include establishing permissions on the network (e.g., the ability of the master device to control and/or access content on the slave device, etc.). In subsequent pairings, the network may remember prior pairings to facilitate identification and/or distribution of content.

In another embodiment, a set of given permissions may have been associated with device X1. At a later point in time, a master device may request permission for additional functionality from a slave device (e.g., the ability to access content, etc.). In another approach, the slave device may grant extended access to the master device (e.g., allow access to files/folders, increase permission level for the associated master device, etc.). In yet another approach, the slave device may push content to the master device. In such a situation, the content received may first be sent as a request to the master device. Moreover, the content from the slave device may be pushed to the master device in response to determining that the request has been granted (e.g., based off of automatic settings, based off of user input, etc.).

In one embodiment, pushing content from a slave device to a master device may include transferring media content from a slave device to a master device. Upon receiving the transferred media content, the master device may then process and further distribute the media content. In other embodiments, the master device may grant permissions (e.g., temporary permissions, permanent permissions, conditional permissions, etc.) which allow the slave device to function in such a manner that the slave device is able to distribute the media content to other devices and/or displays. Accordingly, the master device may control which one or more slave devices have permission to direct and distribute the media content.

In another embodiment, if the slave device has permission to distribute the media content, the slave device may process and then distribute the media content, distribute a package of optimized media content formats, and/or distribute the media content in any other manner, e.g., thereby performing like the master device.

In some approaches, the slave device may include media content stored in places other than on the slave device, e.g., in a cloud storage network, on an external drive, etc. Accordingly, the slave device may distribute the media content to other devices, preferably in a manner consistent with how the master device would distribute the content, e.g., by processing the media content and then distributing it, have each device process the content individually, etc. Thus, in some approaches the slave device may function as a pseudo-master device, with enhanced permissions, while still under the control of the master device.

As mentioned above, more than one master device may exist in some embodiments. For example, a mobile device may be associated with the master user and predesignated as a master device. Moreover, a car infotainment system may be predesignated as a master device. Thus, in some approaches, both the car infotainment system and the mobile device may both function as master devices, and may include an equal ability to control all slave devices, ability to control the distribution of media content, and/or any other control of the system.

In one embodiment, if more than one device is designated as a master device, a hierarchy of master devices may additionally be specified, e.g., by a user. For example, in the case where two mobile devices and a car infotainment system have been designated as master devices, the car infotainment system may be designated as the first master, and the other master devices may be designated below (lower in terms of the hierarchy than) the infotainment device.

In other embodiments, the master device may be temporarily revoked and/or suspended. According to an example, if media content is being controlled by one device (e.g., the setup and/or distribution is being performed using one master device, etc.), then other master devices may be disabled from controlling the media content until the processing master device has finished displaying the media content, the master device has transferred control of the media content to another master device designated by the processing master device (e.g., or to any other device), etc.

According to another embodiment, the hierarchy of master devices may be based on the time at which the master device is registered on a network. For example, a set location may have a designated network (e.g., a wired system, a wireless system, etc.) to which devices and displays may be connected. As master devices log onto the network, the order in which the master devices have logged onto the network may be tracked and used to indicate the master hierarchy. In other words, the first registered master device will be designated as the control master (the highest master device in the master hierarchy), while subsequently registered master devices will be designated lower in the hierarchy accordingly.

In a further embodiment, the hierarchy of master devices may be based on device-to-device integration. For example, a device may be designated as a central device. As mentioned above, as master devices log onto the network, the order in which the master devices have logged onto the network may be tracked and used to indicate the master hierarchy. In some approaches, the central device may be designated as a master device. In other approaches the central device may be designated as a slave device.

In some embodiments, the permissions granted to slave devices may be based, at least in part, on context. According to one approach, the context may depend on the content type, e.g., the type of data being acted upon, such as video, photos, music, games, etc. For example, a slave device may have permission to stream video content to other devices and/or displays. However, the same slave device may not have permission to stream game content and/or other interactive material, e.g., to other devices and/or displays. According to other approaches, the context may be dependent on geographic information (e.g., slave device has increased permissions based on geography bounds, etc.), time related information (e.g., after being connected for xx minutes permissions are increased, etc.), frequency related information (e.g., after being connected xx number of times permissions are increased, etc.), a user type (e.g., adult, child, student, teacher, etc.), a group (e.g., marketing, advertising, managerial, etc.), a position (e.g., manager, administrator, etc.), etc., and/or any other form of data which may be used to determine the context.

In some embodiments, the master device may remain a master device. For example, a device previously designated as a master device may remain a master device for future interactions, e.g., until provided otherwise. However, in other embodiments, a central device may continuously assign relevant permissions to the same device.

In other embodiments, the status of a master device may not be constant. For example, a central hub may determine which device is designated as a master device based off of context, e.g., such as granting master control to the device connected to a network which is associated with the highest ranking individual. As such, the designation of master device may change based on which devices and/or users are connected to the network system (e.g., wired network, wireless network, device-to-device integration, central device integration, etc.).

As an example, a physical room may have multiple displays for displaying presentations. As employees connect to a network associated with the room and work in the room, the employee with the highest designated position may be grated control of the slave devices in the room (e.g., the displays, etc.). In some embodiments, other devices in the room (e.g., personal mobile devices associated with other individuals, etc.) may be designated as slave devices. For example, users may accept slave designation while they are located in the room and/or are connected to the network. However, if the president of the company enters the room, the control of the displays and/or of the slave devices may be automatically transferred to a device associated with the president which is also connected to the network. In other embodiments, the transfer may be manual, or may require some user interaction (e.g., displaying on the president's mobile device "Would you like to control this room?"). In this manner, which one or more of the devices which are designated as a master device may change based on the context of the participants and/or the devices connected to a given network.

In another example, a car may have multiple displays and interactive devices. In some embodiments, at least some of these devices may be permanently integrated into the car system (e.g., incorporated into seat-backs, integrated into car deck, etc.). In other embodiments, at least some of these devices may be mobile (e.g., may be removed from the car, etc.). In such a situation, a child may be using a tablet and, based on the designation of being a child user, the tablet may be designated as being a slave device. However, if the tablet is passed to another user (e.g., a parent, an administrator, etc.), the user may login with credentials and the device may be designated as a master device, thereby automatically switching the functionality of the tablet to that of a master device. In this manner, which device is designated as a master device may be based off of the user controlling the device.

In other embodiments, at least some elements and/or devices may remain constant while other devices and/or designations change. For example, in one embodiment, a central device may be designated as a constant master device. Other master devices (e.g., mobile devices, etc.) may continually change as the users of the device change. However, the central device may remain as a constant master device on the network system.

As an example, a classroom may include a central device which is associated with the classroom (e.g., based off of geographic location, etc.). As students having devices enter and exit the classroom, the number of slave devices connected to a network associated with the classroom may be continually changing. Additionally, while a teacher is in the room, devices associated with the teacher may be designated as master devices. However, as other users enter the room (e.g., administrators, deans, supervisors, etc.), the controlling master device may change. For example, an administrator may have the ability to take control of the devices in the classroom. However, amidst the changing of devices and/or permission levels, the classroom central device may continually function as a master device (e.g., a supplemental master device). For example, the classroom may only have slave devices and the central master device connected to a network. In such an embodiment, the central master device may function as any other (e.g., a normal) master device.

Even if other master devices were also associated with the network system, the central master device may still function as the controlling master device. Moreover, in some approaches the central device may display and/or control the hierarchy of master devices on the network system. Thus, a central device may remain constant while other slave devices and master devices may change (e.g., connect to and disconnect from the classroom network).

In one embodiment, a central device may control distribution channels associated with a network. For example, the central device may dictate that media content be streamed via a wired network, a wireless network, and/or any other connection or protocol. In other embodiments, the central device may dictate that media content be streamed directly to individual devices, and may further manage all connected devices (e.g., maintain slave/master relationships, etc.).

In some embodiments, interaction with the network system may require the device to be present (e.g., within the range of the wireless network system, within range of the wired network system, within range of device to device communication, etc.). In other embodiments, interaction with the network system may occur remotely. For example, in one embodiment, a master device may remain a master device (e.g., over all other slave devices in the network system) even when not present within the actual network system. According to some approaches, the master device may remain in connection with the network system using remote connections. However, in other approaches, the master device may remain a master device of a network system without maintaining connection thereto.

As an example, a bus may be managed by a corporate entity. The corporate entity may include a master device for use in the bus to control all other devices and/or displays connected to a network associated with the bus. The bus may also include a central device for communicating with the master device (associated with the corporate entity) and any other device detected on the bus network. When the master device is away from the network system, the master device may still connect to the network system through an internet connection and/or any other remote connection interface system. The master device may contact the central device to administer to requests by other devices on the network system. Moreover, the master device may control what is being displayed on the network system in some manner. According to one example, the bus system may be associated with a tour, and the central device associated with each network system in each bus may be controlled by one global master device. In this manner, the company may retain control in directing and distributing content to each of its busses, despite being at a remote location, e.g., corporate headquarters.

In another embodiment, an additional benefit of such a configuration is that real-time updates to the system may be applied and/or controlled. For example, a system of pods or shuttles may autonomously transport individuals to and/or from a location. Having the capability of tailoring the content displayed for each group of passengers may allow greater personalization depending on the route, passenger demographic, ticket price (e.g., tiered service levels), etc. As one example, a group of foreign tourists taking a shuttle may not comprehend what is being said on the radio. The network system may detect one or more devices whose preferred language is not English. The network system may communicate this back to the central device and/or the master device, and the master device and/or central device (e.g., if the central device is functioning as a master device) may change what is being displayed and/or presented so that it is in the tourists' preferred language.

According to another example, a group may pay a higher ticket price corresponding to a guided (e.g., narrated) tour during their ride on a bus. As passengers enter the bus and scan their tickets, the scanner may relay information pertaining to the type of bus ride that has been paid for by the passengers back to the central device, which may in turn relay that information back to a remote master device. Using the relayed ticket information, the master device may determine the number of passengers on the bus, the route which the bus is to take, the anticipated length of the tour, driving direction, a pre-recorded audio narration of the trip, a video package corresponding to the trip, etc. Depending on the amount and/or type of information determined based on the received ticket information, the master device may send data back to the bus which may be used, played, projected, etc., accordingly.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
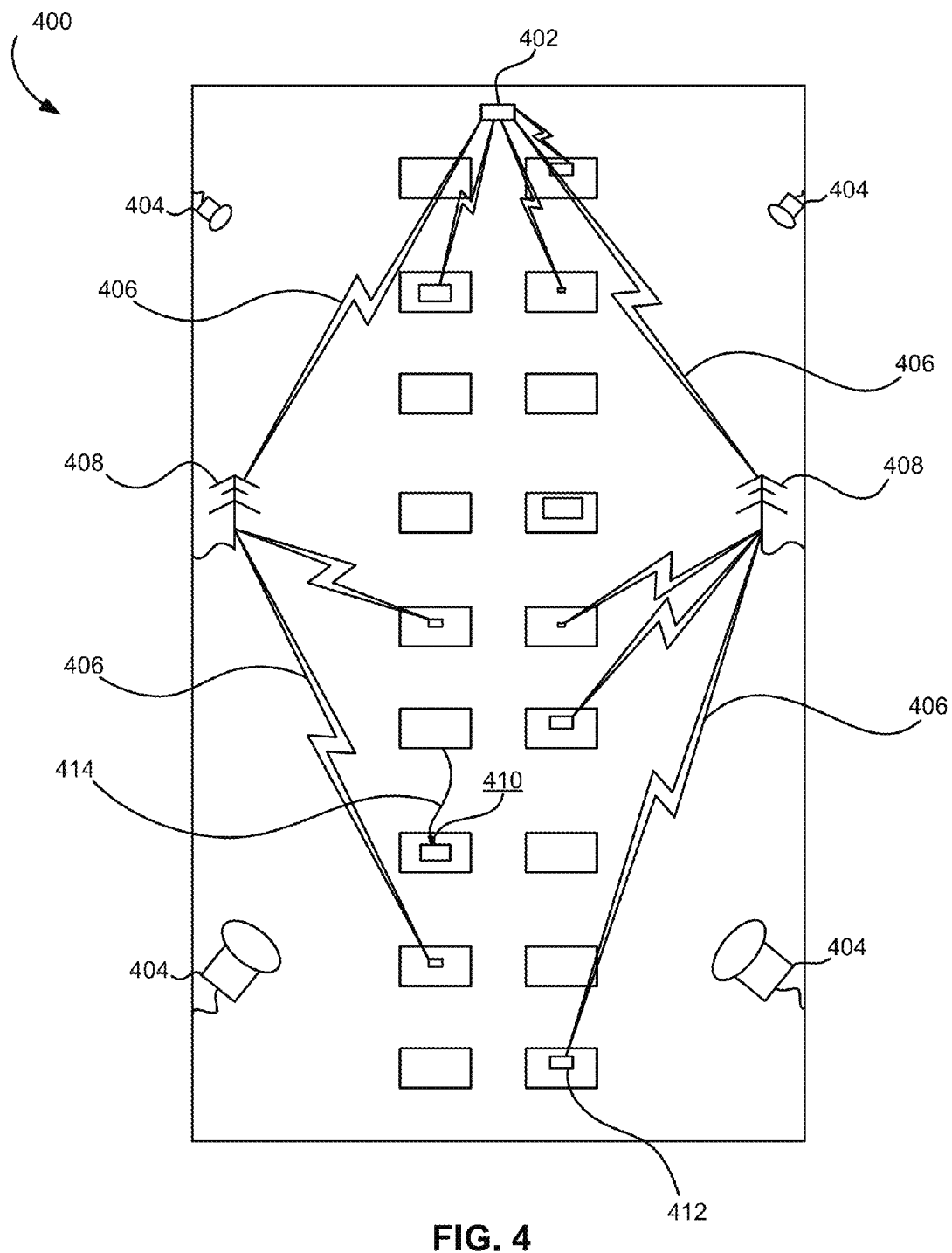
FIG. 4 shows a network architecture, in accordance with one possible embodiment.

FIG. 4 shows an architecture 400 for the directing and managing of a network system, in accordance with one embodiment. As an option, the architecture 400 may be implemented in the context of the details of any of the other Figures. However, such architecture 400 and others presented herein may be used in various applications and/or in permutations which may or may not be specifically described in the illustrative embodiments listed herein. Further, the architecture 400 presented herein may be used in any desired environment. Moreover, the aforementioned definitions may equally apply to the description below.

As shown, the architecture 400 includes one or more devices 402, one or more audio speakers 404, a wireless network system 406, one or more signal repeaters 408, one or more connector pins 410, one or more display devices 412, and one or more direct data lines 414. Of course, in other embodiments, fewer or more features and/or items than those shown in 400 may be included.

In one embodiment, the architecture may function only as a wireless network system. For example, in various embodiments, the media player devices, audio speakers, and display devices may communicate via a wireless protocol (e.g., WiFi, WiFi direct, Bluetooth, etc.). In one embodiment, a connector pin and/or dock connector may allow the device to communicate wirelessly with the wireless network system. For example, in one embodiment, a device may not be wireless capable, but connecting to a connector pin and/or dock connector may provide the wireless resources to the device which may then communicate wirelessly.

In one embodiment, the wireless network system may include one or more wireless networks. For example, the architecture may allow the devices to communicate device-to-device (e.g., using Bluetooth, etc.) while still allowing each device to maintain a separate data connection (e.g., cellular network access, etc.). In such an embodiment, each device's network connectivity may contribute to the entire architecture's overall data connectivity. In one approach, the architecture may leverage each device's individual data connectivity to efficiently allocate, request, and/or retrieve content media. As an example, the master device may detect a video associated with a slave device. However, the slave device may not have the video actually stored on the physical device itself, e.g., the video may be stored on a remote storage device such as a cloud based storage system. In response, the master device may begin to retrieve the video via the slave device, and upon retrieving the video, then broadcast it to the other display and/or media player devices. In such an embodiment, therefore, the slave device is used to retrieve the media content, and then send the media content to the master device for distribution. In another embodiment, the master device may distribute the data request among more than one data connected devices. According to one example, a slave device may be associated with a video stored in the cloud. The master device may request more than one device (e.g., in addition to, or rather than, the host slave device) to retrieve one or more parts of the video, process the one or more parts of the video, distribute the one or more parts of the video to other display and/or media player devices, etc. Thus in some approaches, the slave devices may be used to leverage each of their own data connection to provide a better service (e.g., higher bit rate, higher quality, etc.) to the presentation of the media content.

In another embodiment, a master device may direct other slave devices to fetch and/or retrieve individual media content from one or more storage locations. Once retrieval begins, the master device may direct the presentation of the media content. For example, the master device may temporarily grant a slave device the ability to stream the retrieved media content to the other master devices, slave devices, displays, etc., in the network system. Once the slave device has finished retrieved media content that has been requested, the master device may revoke the ability and transfer such an ability to another slave device for presentation of the next media content, and so on. In this manner, the master device may direct the presentation of media content, while leveraging a network data connection for each device.

In another embodiment, the architecture may function only as a wired network system. In such an embodiment, the network system may function as a closed system (e.g., having no data connection, etc.). According to one approach, the presentation of media content may be limited to that which is already stored on the devices connected to the network system. The master device may temporarily grant a slave device the ability to stream the media content to other devices connected to the network system. Moreover, the slave device may stream the media content directly to the master device, which may then distribute it to the other devices and/or displays on the network system. In some approaches, the master device may direct other slave devices to retrieve at least part of the media content from a particular slave device. Once retrieved, the individual slave devices may process (e.g., render a video and/or optimize the video for various screen sizes, etc.) and then stream the content to the other devices and/or displays on the network system, e.g., when requested.

In one embodiment, a wired system may include dock connectors, pin connectors, Ethernet connections, etc., and/or any other types of connections to join the devices and/or displays together to create a wired network system.

Further yet, the architecture may function as a joint wireless and/or wired system. In such an embodiment, the network system may incorporate aspects of wired connections and wireless connections. In one approach, one or more of the devices may be connected to a wired network system. Additionally, one or more other devices may be connected wirelessly to the same network system (e.g., using WiFi, Bluetooth, etc.). In other approaches, the devices may create a mesh device-to-device wireless system (e.g., using a Bluetooth mesh networking system, etc.).

In some embodiments, when the devices are connected to, for example, a wireless network system, they may still have access to a cellular data connection. In other embodiments, the devices may lose a cellular data connection once they connect to a wireless network system. As such, to preserve the device's ability to utilize the cellular data connection, the devices may organize into a mesh topology (e.g., Bluetooth mesh network, etc.) where the master device may connect individually to each slave device, and/or each slave device may simply connect to its nearest device neighbor and forward on requests and/or media content. In this manner, aspects of both a wired network topology, a wireless network topology, and a device-to-device network topology may be integrated into one cohesive network system.

In one embodiment, a cohesive network system may allow for higher overall bit rates (e.g., aggregate data connections, etc.), redundancy of requests (e.g., each request is sent through two devices to minimize dropped packets and/or lower quality, etc.), and/or any other network feature to effectively present the requested media content.

In another embodiment, the network system may be connected to a global network drive for use by each of the connected devices. For example, in one approach, the network system may include a network storage drive. Each device may have access to this drive, and when requests are sent by the master device to the individual slave devices, the requested content may be provided and sent directly to the central network drive. In some embodiments, the master device or the central device may function simultaneously as a network drive. However, in some embodiments, a separate network drive with its own network connectivity (e.g., wired, wireless, etc.) may be provided to minimize network bottlenecks (e.g., information and requests are all filtered through the master device, etc.).

Figure 5A:
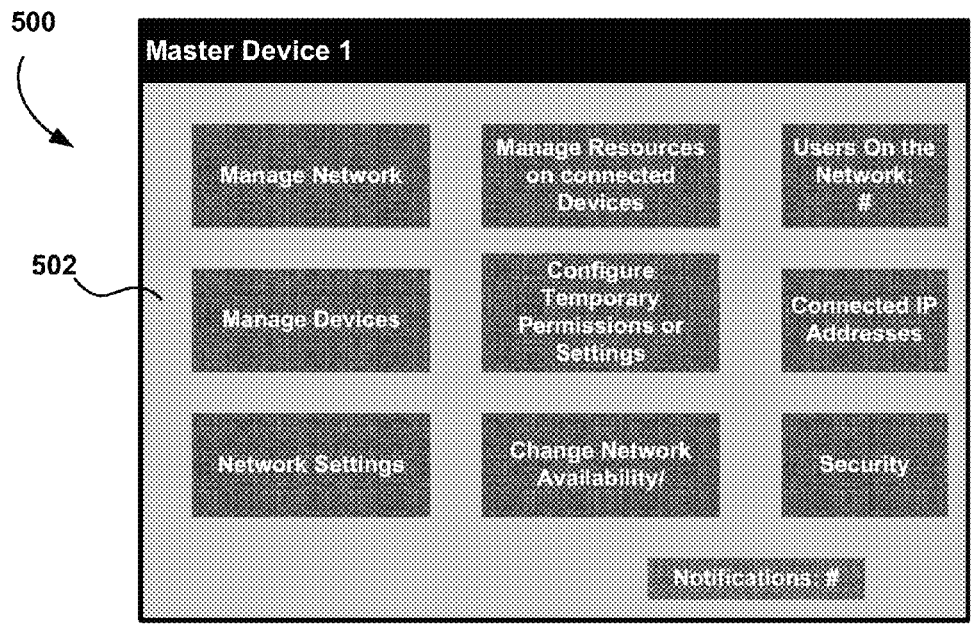
FIG. 5A shows user interface for managing a network system, in accordance with one embodiment.

FIG. 5A shows a user interface 500 for managing a network system, in accordance with one embodiment. As an option, the user interface 500 may be implemented in the context of the details of any of the Figures. However, such user interface 500 and others presented herein may be used in various applications and/or in permutations which may or may not be specifically described in the illustrative embodiments listed herein. Further, the user interface 500 presented herein may be used in any desired environment. Moreover, the aforementioned definitions may equally apply to the description below.

As shown, the user interface 500 includes one or more settings 502. In various embodiments, the one or more settings may include ability to manage network and/or devices, network settings, management of resources on connected devices, ability to configure temporary permissions, users on the network, security, etc. In one embodiment, the interface may be displayed automatically when a network is established. For example, in one embodiment, when a network is created the user interface may be displayed to the creator to then manage and/or modify the network and its settings.

In one embodiment, the ability to Manage Devices may be a setting within the user interface. For example, the connection of one or more devices may depend on a variety of factors that may be changed within this setting. In one embodiment, the connection of devices may depend on the device. For example, in another embodiment, if the device has previously been connected to the network it may be allowed to connect to the network again, e.g., without any additional permissions to connect. In another embodiment, the connection of one or more devices may depend upon permission from one or more devices already connected to the network. Further, this function may be used to manage all devices on the network or, in another embodiment, it may be to manage individual and/or groups of devices on the network.

In another embodiment, the user interface settings may allow the user to manage the resources of the devices on the network. For example, in one embodiment, if one or more devices has access to resources (e.g., 4G data, WiFi, Bluetooth, etc.) outside of the network it may be permitted for other users to access those resources through the network as permitted by the manager of the network.

Still yet, in one embodiment, the configuration of temporary permissions and/or settings may allow the manager of the network to alter the settings and permissions of the users on the network. In another embodiment, the altering of the network may occur for a specified duration. For example, in one embodiment, a permission may be given for a current user on the network to act as a master device thus controlling and manipulating the network temporarily. In another embodiment the duration of permissions may be fixed by the device creating the permission. In another embodiment, the duration may be generated to expire when the device becomes idle on the network for a time specified by the user of the device allowing permission.

In another embodiment, a change of network availability setting may be used to regulate the network. For example, in one embodiment, the availability may be changed so that only users who have previously connected to the network may connect. Further, the network may be configured, in accordance with this or other functions of the network, to limit the number of users on the network at one time. In addition, the availability of the network may be configured such that only devices already connected may find and/or allow other devices to connect to the network.

Still yet, in one embodiment, settings within the interface that display information that may be updated or altered based on activity on the network (e.g., notifications, number of users on the network etc.) may be updated through a manual process established by the creator and/or manager(s) of the network or the network may be configured to automatically process these and/or other updates in accordance with predetermined parameters. For example, in one embodiment, the network may process and update this information after a specific lapse of time. Further, in another embodiment, the update may occur based on the actions taken by devices connected to the network (e.g., connection/disconnection, sending information to the network, managing connectivity/resource availability etc.).

Figure 5B:
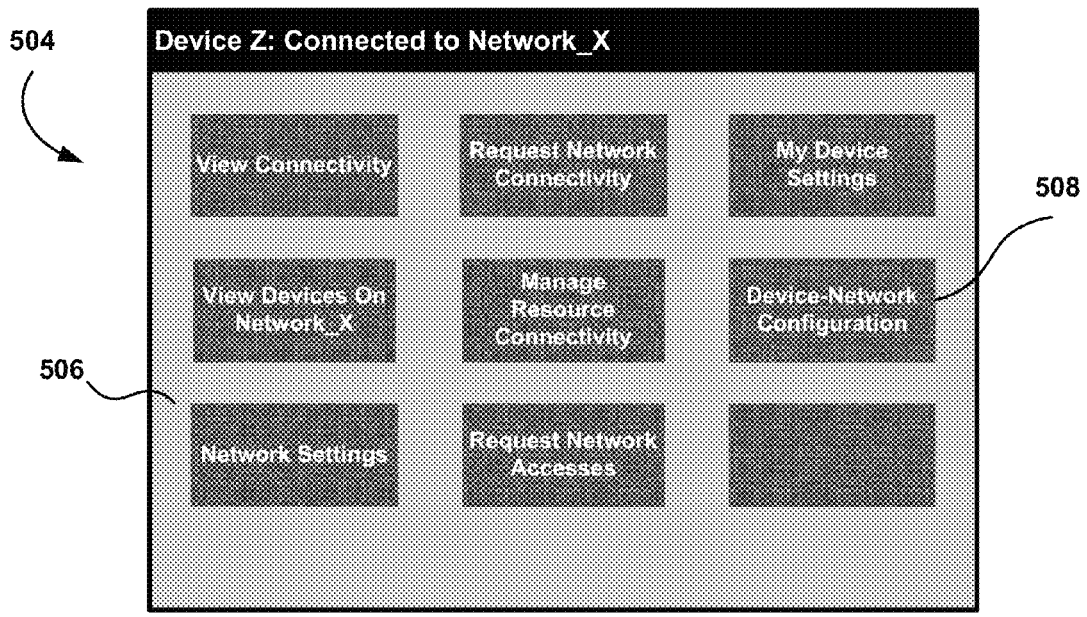
FIG. 5B shows user interface for managing a network system, in accordance with one embodiment.

FIG. 5B shows a user interface 504 for interacting with a network system, in accordance with one embodiment. As an option, the user interface 504 may be implemented in the context of the details of any of the Figures. However, such user interface 504 and others presented herein may be used in various applications and/or in permutations which may or may not be specifically described in the illustrative embodiments listed herein. Further, the user interface 504 presented herein may be used in any desired environment. Moreover, the aforementioned definitions may equally apply to the description below.

As shown, the user interface 504 includes one or more settings 506. In various embodiments, the one or more settings may include ability to view devices on the network, manage network settings, manage resource connectivity, request network accesses, manage device settings, manage device-network configuration etc. For example, when one or more devices connects to the network the user interface 504 may be automatically displayed on the devices allowing them to alter the relationship that they have with the network.

In one embodiment, the ability to view devices on the network may allow secure or unsecure communication between devices. For example, in another embodiment, one or more users on the network may view one or more other connected devices and establish a connection with that device which connection may include the transfer of data, files etc. Further, in another embodiment, if one or more devices have external resources available (WiFi, Bluetooth, etc.), these resources may be viewed and requested for use by one or more devices on the network.

As shown, device settings 506 may be displayed on the device. Additionally, Device-network configuration 508 may also be displayed.

In one embodiment, one or more users on the network may modify their connection to the network. For example, in another embodiment, one or more devices may assign the network as a primary network that the device is always connected to when within range. Further, in another embodiment, one or more devices may set preferences to connect to the network automatically within range if allowed by the network.

Figure 6:
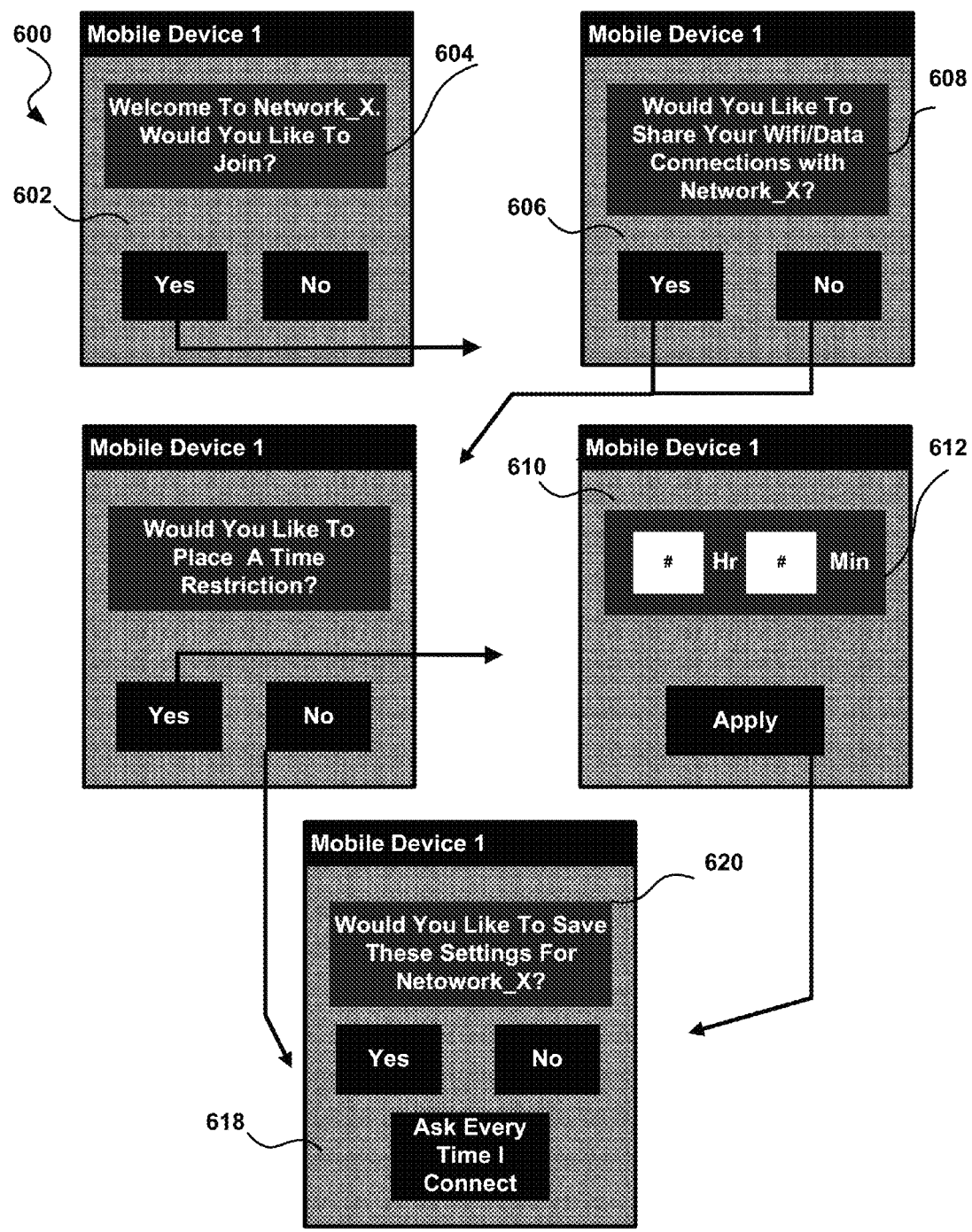
FIG. 6 shows multiple user interfaces for managing a network system, in accordance with one embodiment.

Now referring to FIG. 6, a flowchart of an interactive method 600 for connecting to a network system is shown according to one embodiment. The method 600 may be performed in accordance with the present invention in any of the environments depicted in FIGS. 1-5B, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art. Further, the aforementioned definitions may equally apply to the description below.

As shown, the method 600 includes one or more user interfaces 602. In various embodiments, the one or more user interfaces may include ability to connect to a network, define specifications for a connection, create permissions, establish and save preferences for future use, etc. For example, in one embodiment, when a network is detected within range of one or more devices, a method may be presented to the one or more devices permitting a connection to the network.

As shown, a method may include a user interface 602, and a prompt 604 to join a network.

In one embodiment, one or more devices interacting with this or other user interfaces similar in nature may join the network by selecting the option to join which may lead this device to other user interfaces similar to those presented or, in one embodiment, may directly connect the device to the network as established by the network system and manager of the same. In another embodiment, one or more devices may choose to remain outside of the network through the selection process. Further, in various embodiments, the user interface may be displayed automatically on one or more devices. For example, in one embodiment, if the network and/or one or more devices detects that a connection has previously been made between the network and one or more devices, a prompt may appear automatically inviting the user to return to the network. In another embodiment, if one or more devices are detected within range of the network, the network may be configured to ask the device to join the network.

In another embodiment, the ability to join the network may be manually accessed by one or more devices. For example, in various embodiments, one or more devices may be within range of the network and acknowledge it as a potential connection thereby allowing the user of the one or more devices to select the network and request admittance to it thereby accessing the prompt to join the network.

As shown, the method 600 may include a user interface 606 and a prompt 608 to allow the contribution of resources of one or more devices to the network.

In one embodiment, one or more devices may request access to a network which may be established such that the one or more devices on the network may contribute resources to the network and to one or more other devices on the network. For example, in various embodiments, one or more devices connecting to the network may allow permissions for one or more devices on the network to access the resources available to that device (e.g., 4G data, WiFi, enhanced processing capability, etc.,) either wired or wireless. Further, in another embodiment, the allocation of resources may be customized by the one or more devices contributing in order to maintain control of resources.

Still yet, in various embodiments, if an allocation of resources is permitted by one or more devices on the network a preference may be allocated to one or more devices on the network. For example, in one embodiment, the one or more devices with the resource available to them may receive priority over devices requesting access to those resources. Further, in another embodiment, if a hierarchy of devices exists, a preference may be given to those devices designated by the network to be of greater importance. Additionally, in one embodiment, the network may allow for one or more users on the network to retain resources for personal use and deny them to the network and/or one or more users on the network.

Still yet, in one embodiment, the network may be established to necessitate that one or more users on the network contribute resources to the network in order to connect. For example, in another embodiment, in order to receive access to a network one or more devices may be required to acknowledge that any resource available within the network system and/or devices connected to the network are available for use by any and/or all devices and systems in the network.

As shown, method 600 may include a display 610 and a system 612 for the input of information relative to the connection of one or more devices to a network.

In one embodiment, one or more devices connecting to the network may place one or more restrictions on the connection. For example, in one embodiment, these restrictions may apply to the sharing of resources as before explained. In another embodiment, these restrictions may apply to the connection to the network of the one or more devices. Further, in another embodiment, the limit may be an input by the one or more devices or, in another embodiment, the network may be established with a standard limitation as set by the creator of the network. Still yet, in various embodiments, the restrictions as set by the one or more devices or the creator of the network/network system may be based on, but are not limited to, time, data usage, number of users on the network, idle time on the network, location within a hierarchy of devices on the network if one exists, etc.

As shown, method 600 may include a user interface 618 and a system 620 which may be used to save user preferences on the network.

In one embodiment, one or more devices may set preferences to a network if allowed by the network. For example, in one embodiment, if one or more users decides that the current network will be connected to again in the future, the user may choose to save settings for the one or more devices on the network which may include, but is not limited to, resource sharing preferences, connect automatically to the network, time spent on the network, relationship to or with one or more other devices on the network, etc.

Figure 7:
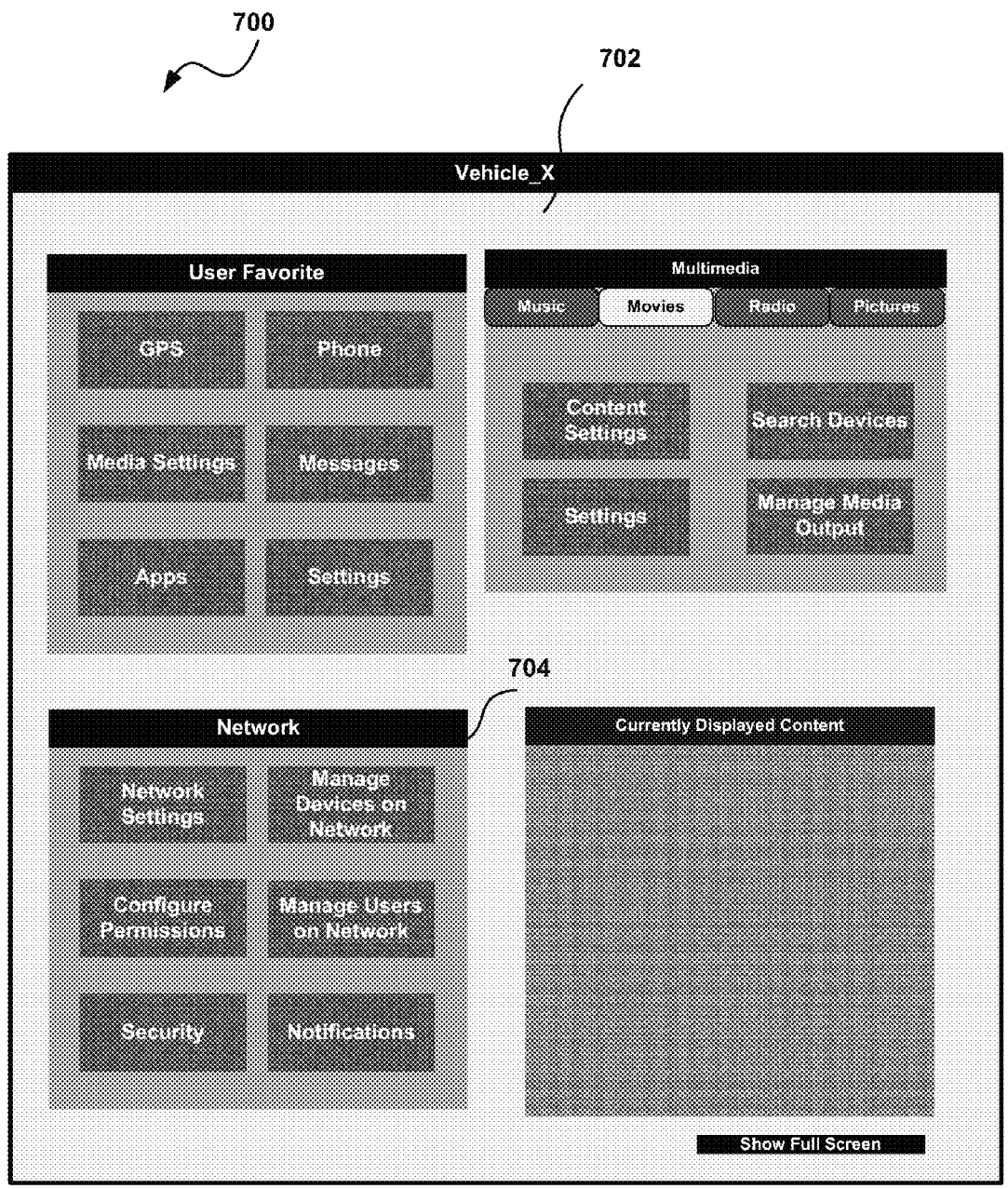
FIG. 7 shows user interface for managing a network system, in accordance with one embodiment.

FIG. 7 shows a vehicle user interface 700 for managing a network system, in accordance with one embodiment. As an option, the user interface 700 may be implemented in the context of the details of any of the Figures. However, such user interface 700 and others presented herein may be used in various applications and/or in permutations which may or may not be specifically described in the illustrative embodiments listed herein. Further, the user interface 700 presented herein may be used in any desired environment. Moreover, the aforementioned definitions may equally apply to the description below.

As shown, the user interface 700 includes one or more displays 702. In various embodiments, the one or more user interfaces may include ability to manipulate various functions of the vehicle, control media settings and distribution, manage a network, etc. For example, in one embodiment, a vehicle may be equipped with various functions which may be displayed simultaneously or individually on the display of the vehicle.

As shown, the user interface 700 may include a display 702 and settings 704 to manage a network system.

In one embodiment, the controls for a network system may be integrated directly into the vehicle's system. In various embodiments the settings may operate in a manner consistent with what has been referenced above. For example, a network may be established between one or more devices. Information may be shared between the one or more devices on the network. In another embodiment, the vehicle system may act as a master device thereby managing the distribution of data and/or media consistent with what has been referred to above.

By way of example, in one embodiment, the vehicle may be equipped with various functions such as, but not limited to, global positioning system, cellular phone syncing/integration, media functions, voice activating management, and, in various embodiments, a network management system. In another embodiment, the network management system may enable the creation of a network system and the management of the same. The user controlling the vehicle system may, in various embodiments, control the network, the users on the network, the distribution of resources, media, data etc. in a manner consistent with what has been referenced above.

Figure 8:
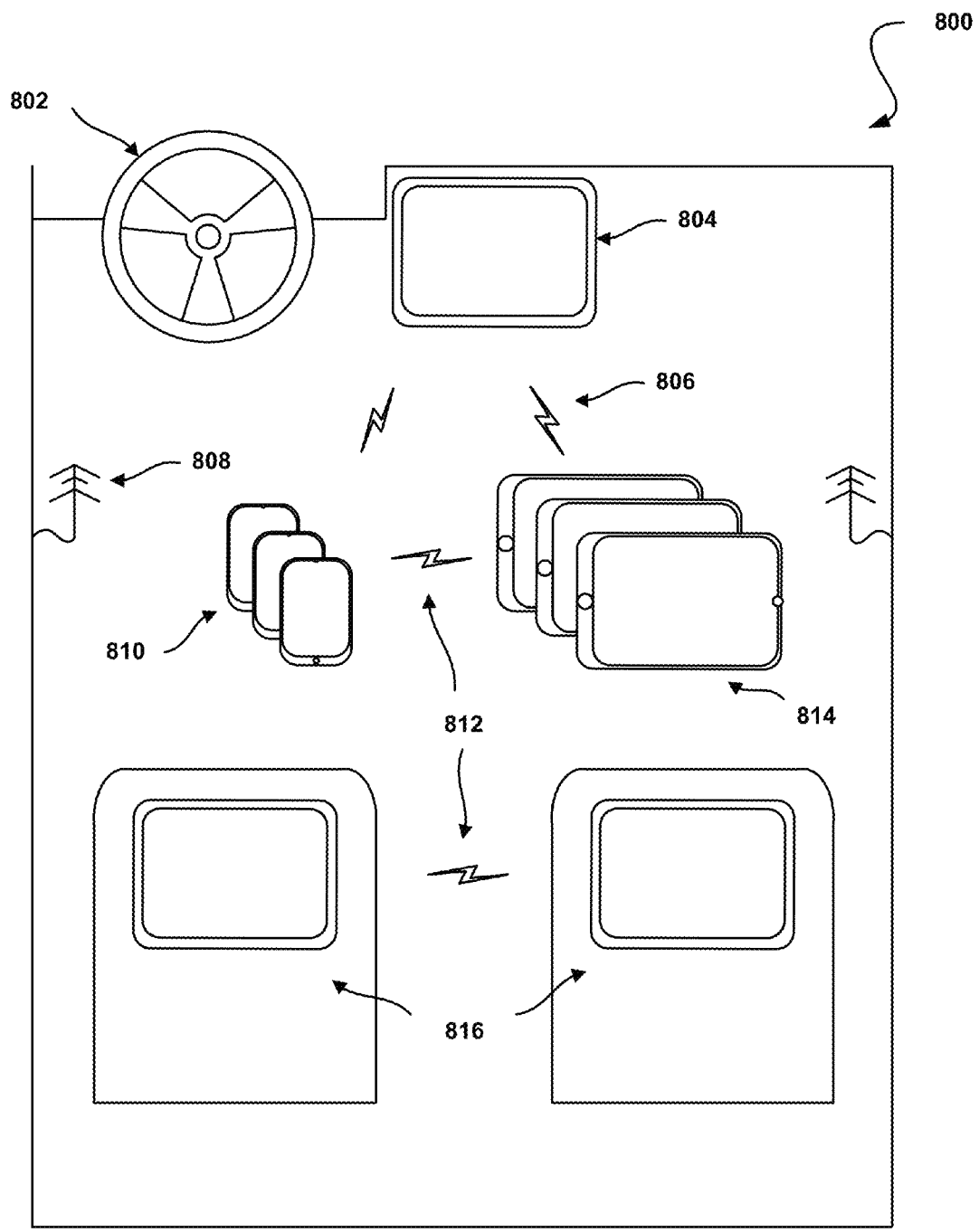
FIG. 8 illustrates a vehicle communication system for distributing and directing a network system, in accordance with one possible embodiment.

FIG. 8 illustrates a vehicle communication system 800 for distributing and directing of media content, in accordance with one embodiment. As an option, the system 800 may be implemented in the context of the details of any of the foregoing Figures. However, such vehicle communication system 800 and others presented herein may be used in various applications and/or in permutations which may or may not be specifically described in the illustrative embodiments listed herein. Further, the vehicle communication system 800 presented herein may be used in any desired environment. Moreover, the aforementioned definitions may equally apply to the description below.

As shown, the system 800 may include steering wheel apparatus 802, an infotainment center device 804, wireless communication 806, repeaters 808, mobile phone devices 810, device to device communication 812, tablet devices 814, and in-seat devices 816.

In one embodiment, the steering wheel apparatus may include the ability to control an infotainment system, one or more mobile devices (e.g., mobile phones, tablets, computers, etc.), and/or any other device associated with the vehicle. For example, in some embodiments, the steering wheel apparatus may include the ability to raise and/or lower the volume, change the music, change the designation of the controlling master device, select which media content to display, select which media content to distribute, approve one or more new devices, approve and/or deny requests from one or more of the connected devices, and/or take any other action relating to the vehicle and media content.

In various embodiments, the infotainment center device may function as a central device and/or a master device. In other embodiments, the infotainment center device may be permanently integrated into the structure of the vehicle. In other embodiments, the infotainment center device may be mobile but must be kept within certain geographic bounds of the vehicle (e.g., within 2 feet of the perimeter of the vehicle, etc.).

In another embodiment, the infotainment center device may be in wireless communication with one or more devices (e.g., mobile phone devices, tablet devices, in-seat devices, etc.). In other embodiments, the communication between the infotainment center device and any device may occur through a wired connection (e.g., dock connector, Ethernet, system connector, etc.).

In one embodiment, the communication between the infotainment center device and any device may occur by any communication technology (e.g., IP, USB, Bluetooth, WiFi, WiFi Direct, Real-Time Protocol, Universal Plug and Play, etc.). Additionally, in other embodiments, the communication may include a standard by which the devices may communicate (e.g., Mirrorlink, etc.). Of course, however, any standard and/or technology may be used to connect the devices (e.g., infotainment center device, mobile phone devices, tablet devices, in-seat devices, and/or any other device in the vehicle, etc.).

In another embodiment, the communication may allow the display and/or media content found on any of the devices to be controlled by a master device (e.g., central device, infotainment center device, etc.). In other embodiments, any of the devices (if permissions are granted by a master device) may control at least part of the functionality associated with the infotainment center device (e.g., raise/lower volume, change channel, change media content, accept/deny new devices and/or requests, etc.). Further still, any of the devices (if permissions are granted by a master device) may control at least part of the functionality associated with the vehicle (e.g., raise/lower air temperature, raise/dim lights, redirect air flow, open sunroof, raise/lower windows, etc.).

In one embodiment, the repeaters may be used to extend the range of the wireless communication. However, in some embodiments, the signal may be sufficiently strong by a device and/or wireless transmitter to not need a repeater. Nonetheless, in one embodiment, the repeaters may be used to communicate with other vehicles and/or data sources. For example, in one embodiment, the repeaters may be used to establish a mesh-network with other vehicles, login to temporarily available WiFi networks, be used to establish and/or communicate with satellites (e.g., for data transmission, etc.), and/or enhance the vehicle network system in any manner.

Further, in another embodiment, the in-seat devices may be mobile (e.g., removable from the seat, etc.) or permanent (e.g., built into the seat system, etc.) devices. In other embodiments, the in-seat system may include a dock into which a mobile device (e.g., phone, tablet, etc.) may be inserted. In some embodiments, the in-seat system may provide charging functionality, network connectivity (e.g., wired connection and/or wireless connection, etc.), and/or provide any functionality to other devices to connect to the vehicle network system.

Figure 9:
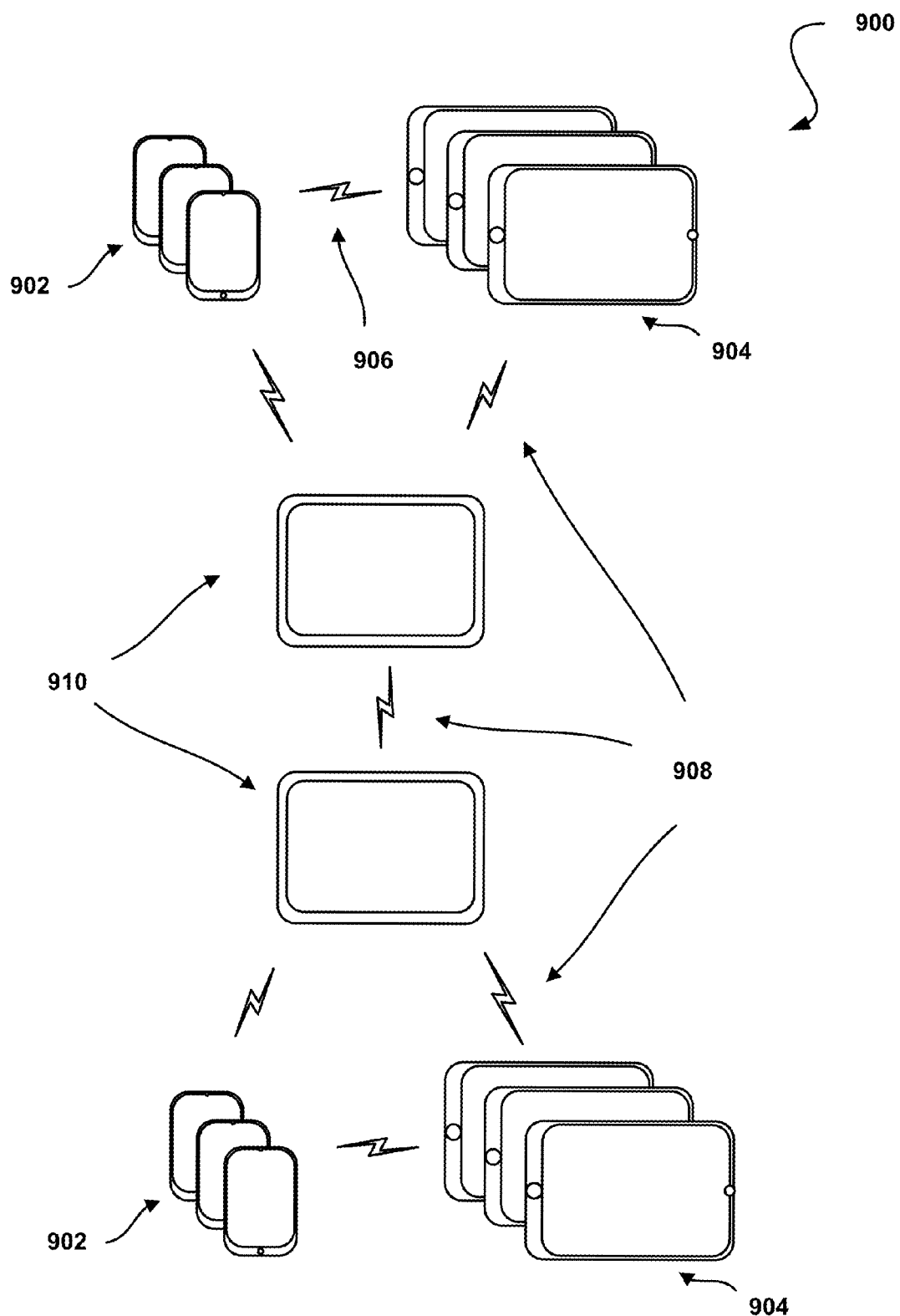
FIG. 9 shows a system for distributing and directing a network system, in accordance with one possible embodiment.

FIG. 9 shows a system 900 for distributing and directing media content, in accordance with one embodiment. As an option, the system 900 may be implemented in the context of the details of any of the foregoing Figures. However, such system 900 and others presented herein may be used in various applications and/or in permutations which may or may not be specifically described in the illustrative embodiments listed herein. Further, the system 900 presented herein may be used in any desired environment. Moreover, the aforementioned definitions may equally apply to the description below.

As shown, the system 900 may include one or more mobile phone devices 902 and one or more mobile tablet devices 904. Additionally, the one or more mobile phone devices and the one or more mobile tablet devices may communicate device-to-device wirelessly 906. In other embodiments, the communication between devices may occur through a wired connection.

Further, as shown, one or more master devices 910 may be included, and wireless communication 908 may occur between the master devices and/or between the master device and one or more mobile phone devices and/or mobile tablet devices. In various embodiments, the one or more master devices may include one or more central devices.

In various embodiments, the master device may direct media content to another mater device and/or any slave device. For example, in one embodiment, the transmitting of media streams may include one or more media streams, including, for example, an audio component stream, a visual component stream, and/or a further real time live update data stream. Additionally, in other embodiments, multiple streams of media content may occur simultaneously.

As an example, in one embodiment, a slave device may push the audio relating to an audio book to the front speaker system of the car audio. In such an embodiment, a separate slave device may push a video which is distributed by a master device to all displays on the networks system, and the audio component is directed back to the car audio system but is played on the back speaker system. In this manner, therefore, multiple inputs and/or streams may be distributed in a network system. Of course, in another embodiment, a first audio stream (e.g., associated with an audio book from a slave device, etc.) may be directed to a car system headphone system, and a second audio stream (e.g., associated with a video from a slave device, etc.) may be directed to a car system audio speaker system. In other embodiments, the transmission of audio streams and/or video streams may be altered and/or configured by the user in any manner.

In a separate embodiment, therefore, audio and video stream information may be split into additional streams as necessary. In other embodiments, the audio and video content may be kept as one stream. Further yet, a master device may keep the audio and video streams as one incoming stream, but output the audio and video stream in more than one stream.

As an example, in one embodiment, a slave device may stream to a master device a video file. The master device may forward the streaming to one or more devices in the network system, wherein the forwarding includes both the video and audio component of the media content. In a separate embodiment, the master device may play the media content, and direct the video and/or audio components separately. For example, a first audio channel may be in a first language, a second audio channel in a second language, etc. and the master device may send out all such channels to all devices. In one embodiment, the devices may automatically determine (e.g., based on preferences, etc.) which audio channel should be played. In another embodiment, the master device may select which audio channel should be sent to specific devices. Further yet, in another embodiment, the master device may stream multiple video channels, each of which may be associated, for example, with separate subtitles. Like the audio channels, the video channels may likewise be sent out to all devices, and configured either automatically (e.g., user preferences, etc.) or by manual settings of the master device (e.g., send video stream with Chinese subtitles to Device X, etc.).

Moreover, in a separate embodiment, such audio and/or video streams may be directed by the master device as desired. For example, in one embodiment, the master device may be associated with a bus touring company, and specific languages may be sent to specific devices based off of the occupants of the bus. Or, in a separate embodiment, each occupant may select the preferred language to be heard on the device, and based off of the temporary user preference, the applicable audio and/or video channel may be played.

In one embodiment, if a slave device is already playing media content, and the master device streams media content, the slave device may retain control as to whether the individually viewed content is continued to be played, or whether content from the master device is played. In another embodiment, preconfigured preferences on the salve device and/or the master device may be control automatic settings, including permitting the master device to automatically stream to and control the display on a slave device. Of course, in other embodiments, a slave device may be configured not to automatically cede control of the display to a master device. In such an embodiment, if media is streamed from a master device, a prompt may be displayed on a slave device requesting permission to display the media content from the master device.

In one embodiment, automatic streaming of content from a master device to one or more slave devices may include pushing content. For example, in one embodiment, the pushing of one or more streams (e.g., video, audio, etc.) may be managed by a master device and/or central device. In another embodiment, the pushing of streams may be controlled by a master device associated with a vehicle assembly (e.g., infotainment center device, etc.).

In another embodiment, streaming of content and subsequent display of content on one or more devices may be based on one or more triggers. For example, in various embodiments, a trigger (e.g., for controlling devices, for pushing content to devices, etc.) may be based off of location (e.g., GPS location, etc.), the type of users that are logged in (e.g., tourists, managers of the company, students of a class, etc.), the number of users that are logged in (e.g., threshold number of users triggers automatic direction by master device, etc.), and/or any other input which may influence how media content is streamed and/or displayed.

In one embodiment, if a master device is requesting content from a cloud-based source, the master device may request a specific size (e.g., screen dimensions, etc.) of the media content. For example, in one embodiment, the master device may detect ten devices on the network system, each of which has a different sized screen. The master device may determine that the largest screen size of the ten devices is 1600×900 pixels. As such, the master device may request form the cloud-based source the media content which would conform to the largest screen size of all of the devices on the network system. Once the media content has been received, the master device may optimize the received media content for other devices with smaller screen sizes on the network system.

In other embodiments, rather than the master device requesting the media content from a cloud-based source, the master device may request each individual slave device of different screen size to request and retrieve the media content based on the screen size of the device. Once received, the slave device may distribute (per the instructions of the master device) the media content to other devices having the same screen size.

In one embodiment, if the number of devices exceeds a set threshold, more than one master devices (or a slave device given extended permissions) may be used to distribute and direct media content. For example, in some embodiments, having one master device may create a bottleneck as all requests are sent to one device, and media content is streamed from one device. In one embodiment, therefore, two or more master devices may work in conjunction in receiving requests and in distributing and directing media content. For example, if more than 20 devices are being controlled by one master device, another device may be promoted to function as a master device to assist in distributing the media content. In such an embodiment, the second master device may still receive commands and/or instruction from the first master device, but may otherwise be capable of distributing and directing media to one or more other devices.

Further yet, in one embodiment, one or more override features may be present in the network system. For example, in one embodiment, the vehicle assembly may include the ability to temporarily disable all permissions on devices and effectively act as a master device. In this embodiment, therefore, a parent may still retain control of devices within the vehicle system even while driving or otherwise controlling the vehicle.

In another embodiment, an override feature (e.g., to override an instruction from a master device, etc.) may be provided whereby a password, a keystroke, and/or any other input may be used to override the control of the master device (or the vehicle assembly).

In one embodiment, the audio and/or video channels may be associated with a hierarchy. For example, in one embodiment, a specific audio stream may not be accessible to all devices, but only those associated with specified metadata (e.g., position of manager, etc.). As such, video and/or audio streams may be selectively distributed. In other embodiments, network system resources may require no permissions. For example, in one embodiment, a backup camera on the vehicle may be accessed by any device on the network system.

Further yet, in one embodiment, the hierarchy of streams may change depending on the context of the input streams. For example, in one embodiment, if the vehicle is backing up and the back-up camera is activated, then the central device display may automatically show the video input stream from the back-up camera. In this embodiment, therefore, streams relating to safety make take precedence over less critical streams. Moreover, in other embodiments, a stream relating to a navigation update, or a news flash relating to an accident ahead, may take precedence over an entertainment stream. For example, the audio from a video being displayed on the devices may be temporarily muted to receive a more important update relating to navigation or a news flash.

In one embodiment, for those audio and/or video streams which may be accessed (e.g., by any slave device, by a device which has permissions, etc.), the device receiving the one or more streams may combine them with digital elements to form an augmented reality. For example, in one embodiment, a video stream from an outward-facing camera on the vehicle may be streamed to one or more slave devices, which may take the video stream and display it on the device and allow the user to interact with the input stream in some manner. For example, the input stream on the device may provide a constantly changing background upon which the user can trace images (e.g., draw or paint application, etc.), play a game (e.g., hop over identified obstacles, search for known targets, etc.), and/or interact with the input stream in any manner.

In various embodiments, the master device may direct where streams are played. For example, one or more devices may be associated with headphones. An incoming message may be localized and played on the headphones associated with the person to who the message is directed. Or, in another embodiment, if a navigation update occurs, rather than muting all speakers in the vehicle, the front speakers surrounding the driver may be muted to play the update. In this manner, therefore, the master device may direct where and how the streams are played.

Figure 10:
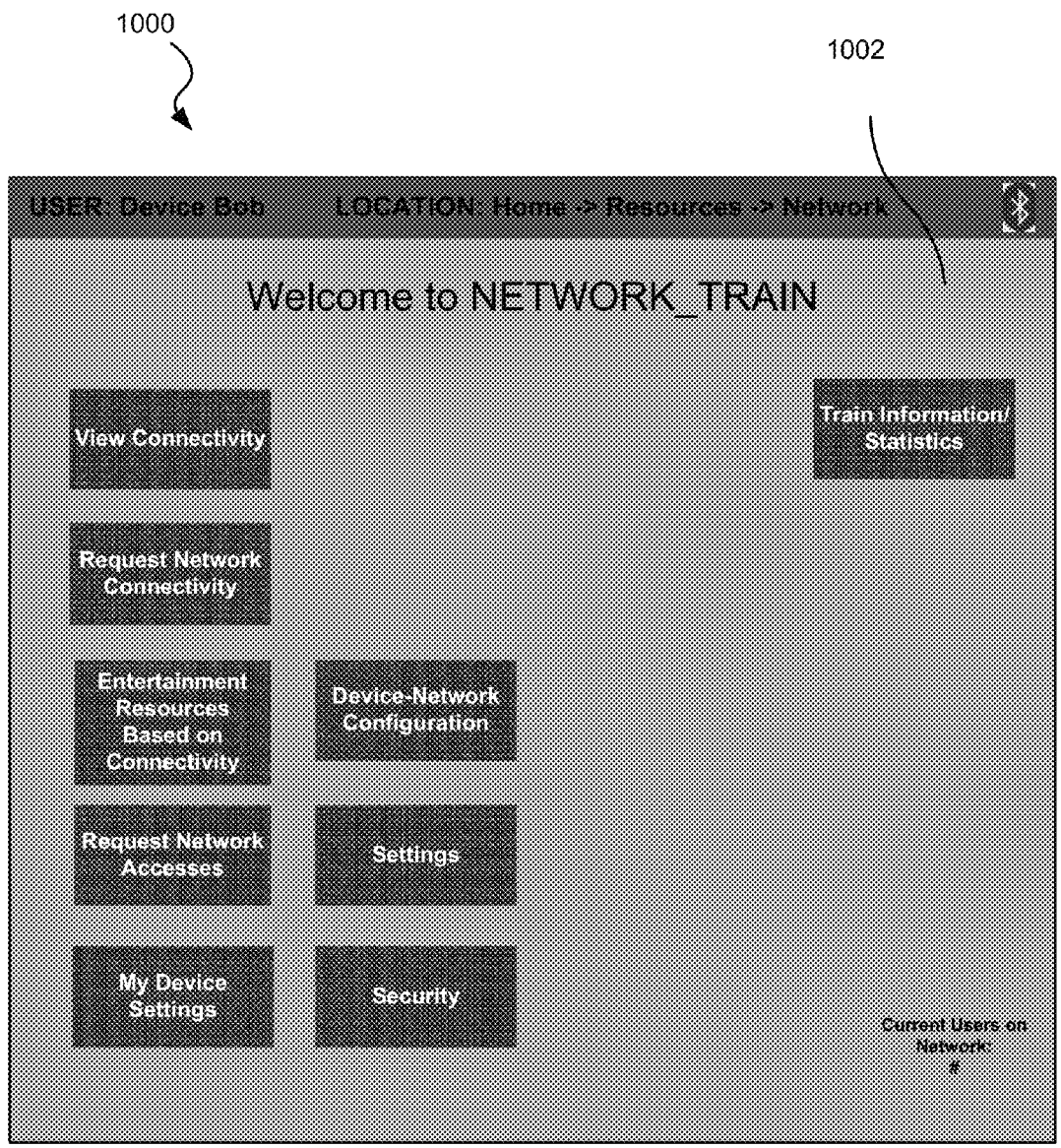
FIG. 10 shows user interface for managing a network system, in accordance with one embodiment.

FIG. 10 shows a user interface 1000 for interacting with a public network system, in accordance with one embodiment. As an option, the user interface 1000 may be implemented in the context of the details of any of the Figures. However, such user interface 1000 and others presented herein may be used in various applications and/or in permutations which may or may not be specifically described in the illustrative embodiments listed herein. Further, the user interface 1000 presented herein may be used in any desired environment. Moreover, the aforementioned definitions may equally apply to the description below.

As shown, the user interface 1000 includes one or more displays 1002. In various embodiments, the one or more display may include ability to manage and/or access a network system, manage and/or access available resources on the network which may include but are not limited to data connections, media and/or other files, available resources of one or more devise on the network etc.

In one embodiment, a network system may be established in a public setting such as but not limited to a train, airplane, airport, mall, public event, etc. which may be accessed by anyone within range of the network. In another embodiment, one or more devices on the network may have access to resources such as information, files etc. that are specific to the network. By way of example, in one embodiment, a train may have a network system established that may be accessed by one or more devices on the train. The network system may, in various embodiments, have resources such as, but not limited to, information about the train, destination, etc. It may also have, in another embodiment, movies, music, games, and any other access as made available by the network.

Figure 11A:
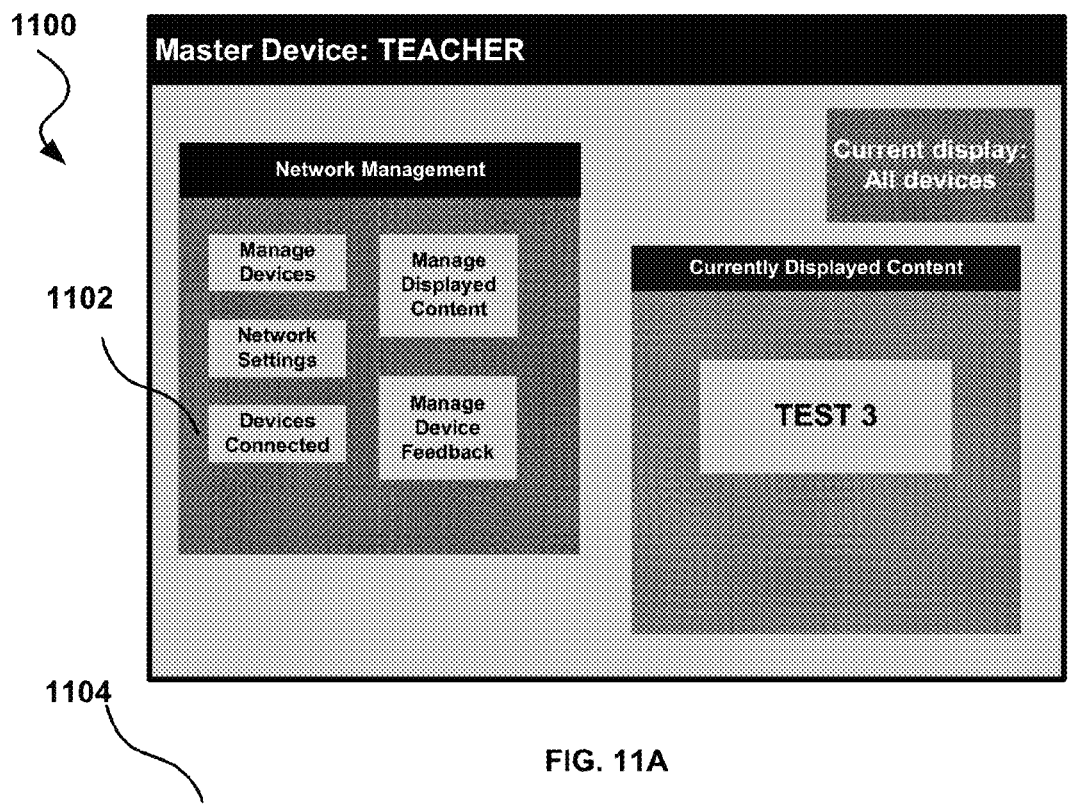
FIG. 11A shows user interface for managing a network based off feedback from the one or more devices on the network, in accordance with one embodiment.

FIG. 11A shows a user interface 1100 for managing the network based off feedback from the one or more devices on the network, in accordance with one embodiment. As an option, the user interface 1100 may be implemented in the context of the details of any of the Figures. However, such user interface 1100 and others presented herein may be used in various applications and/or in permutations which may or may not be specifically described in the illustrative embodiments listed herein. Further, the user interface 1100 presented herein may be used in any desired environment. Moreover, the aforementioned definitions may equally apply to the description below.

As shown, the user interface 1100 includes one or more settings 1102. In various embodiments, the one or more user interfaces may include the ability to manage devices, manage content displayed, network settings etc. The settings 1102 may operate in a manner consistent with what has been referenced above. For example, in one embodiment, a master device on the network may manage the displayed content of the one or more devices on the network and, in another embodiment, may customize the output of information and/or media based on the feedback from the one or more devices.

In various embodiments, one or more master devices on the network may establish or alter the network such that the ability to manipulate the content displayed on the one or more devices within the network is available. By way of example, in one embodiment, a teacher in a classroom may establish a network in order to administer information to the one or more students in the class. The teacher may, in various embodiments, construct a network such that the content displayed is based off of the feedback given from the one or more devices. For example, in one embodiment, the teacher may administer an exam to the students through the network. Based on the submission of answers to the question displayed, the content may change. In various embodiments, the exam content may be altered manually by the teacher or automatically as established by the teacher. Further, in another embodiment, the content of the exam displayed may change individually based on the individual feedback of the devices, or, in another embodiment, the content may change as a result of the combined feedback of all the devices on the network or, in another embodiment, it may be established in any way by one or more of the master devices to best manage the network.

Figure 11B:
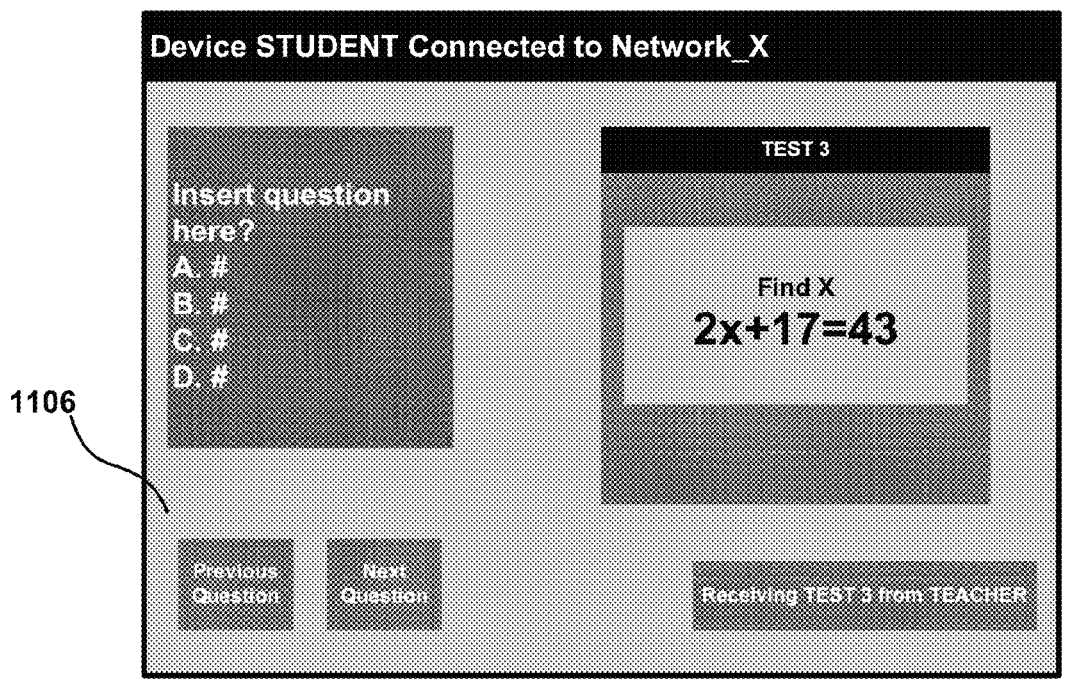
FIG. 11B shows user interface for sending feedback to the one or more managers of the network, in accordance with one embodiment.

FIG. 11B shows a user interface 1104 for sending feedback to the one or more managers of the network, in accordance with one embodiment. As an option, the user interface 1104 may be implemented in the context of the details of any of the Figures. However, such user interface 1104 and others presented herein may be used in various applications and/or in permutations which may or may not be specifically described in the illustrative embodiments listed herein. Further, the user interface 1104 presented herein may be used in any desired environment. Moreover, the aforementioned definitions may equally apply to the description below.

As shown, the user interface 1104 includes one or more input options 1106. In various embodiments, the one or more input options may include a selection of one or more options, user input information, etc. The input options 1106 may operate in a manner consistent with what has been referenced above. For example, in one embodiment, the user may send feedback to the network and manager(s) of the same in a manner consistent with the current setting options of the network.

For example, in one embodiment, the one or more devices on the network may be students in a classroom setting having an exam administered to them. In one embodiment, the exam may be administered to them by the teacher who may or may not be the manager and/or master device of the network. The exam may, in another embodiment, require the submission of answers or response to the exam in some way by the one or more student devices on the network. In various embodiments, the feedback sent by the one or more devices receiving the exam may determine the manner in which the exam is administered.

Figure 12:
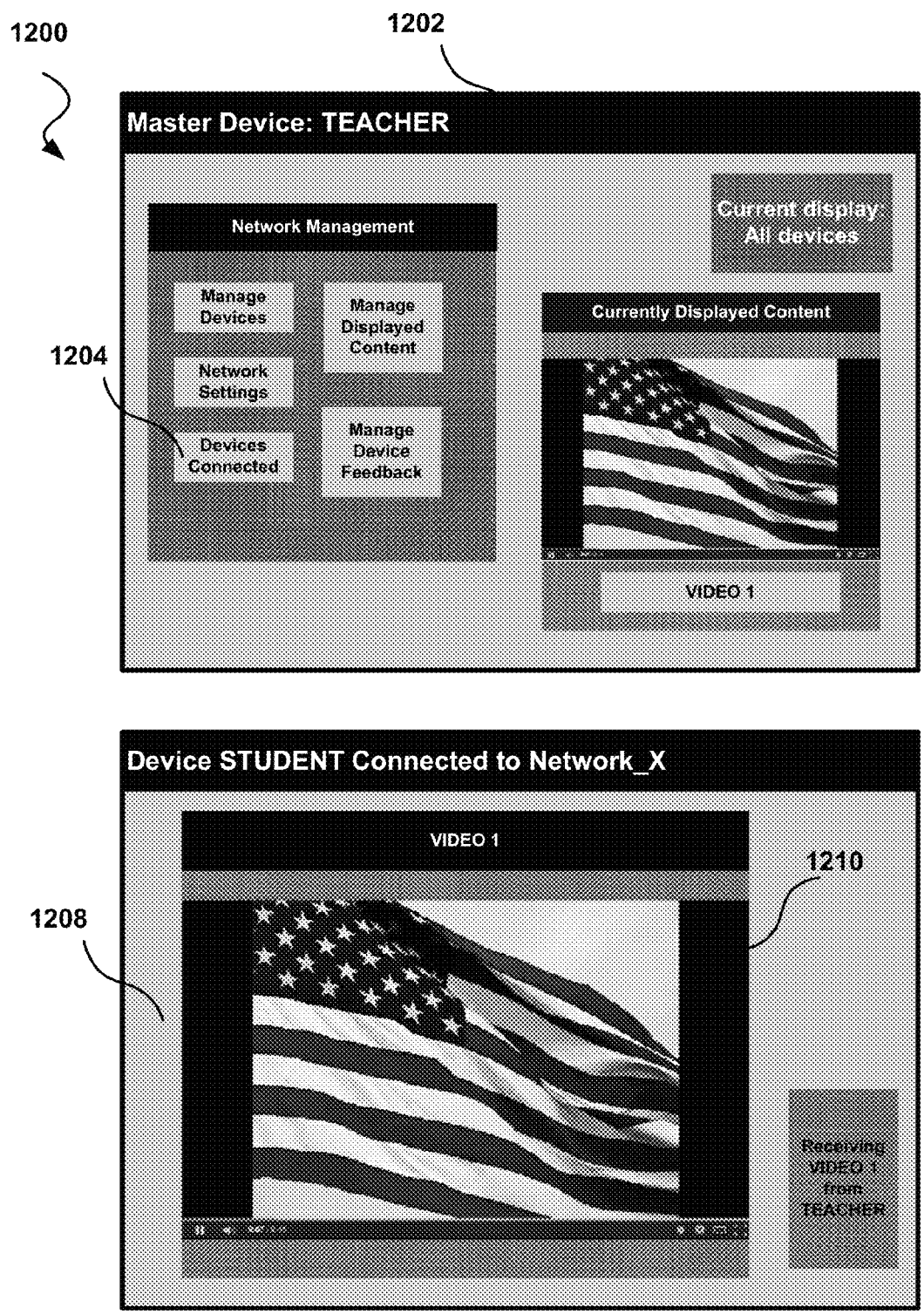
FIG. 12 shows user interface for managing a network system, in accordance with one embodiment.

FIG. 12 shows user interfaces 1200 for managing and participating in the network, in accordance with one embodiment. As an option, the user interfaces 1200 may be implemented in the context of the details of any of the Figures. However, such user interfaces 1200 and others presented herein may be used in various applications and/or in permutations which may or may not be specifically described in the illustrative embodiments listed herein. Further, the user interfaces 1200 presented herein may be used in any desired environment. Moreover, the aforementioned definitions may equally apply to the description below.

As shown, the user interface 1202 includes one or more settings 1204. In various embodiments, the one or more user interfaces may include the ability to manage devices, manage content displayed, network settings etc. The settings 1204 may operate in a manner consistent with what has been referenced above. For example, in one embodiment, a master device on the network may manage the displayed content of the one or more devices on the network and, in another embodiment, may customize the output of information and/or media as desired.

In various embodiments, one or more master devices on the network may establish or alter the network such that the ability to manipulate the content displayed on the one or more devices within the network is available. In another embodiment, the network may be established so that in order to become a part of it, permissions may be required to enable the one or more managers of the network to control the displayed content of the one or more other connected devices. In one embodiment, control may be applied consistently or intermittently as desired by the one or more master devices.

As shown, the user interface 1208 may include a display 1210.

In one embodiment, the display may be manipulated solely by the master devices/manager of the network. In another embodiment, the control of the display may be allocated solely to the user of the one or more devices in accordance with the terms set forth by the master device. Still yet, in another embodiment, the master device may alter the permissions of device display control associated with one or more devices on the network at any time to obtain the most efficient results desired.

Figure 13:
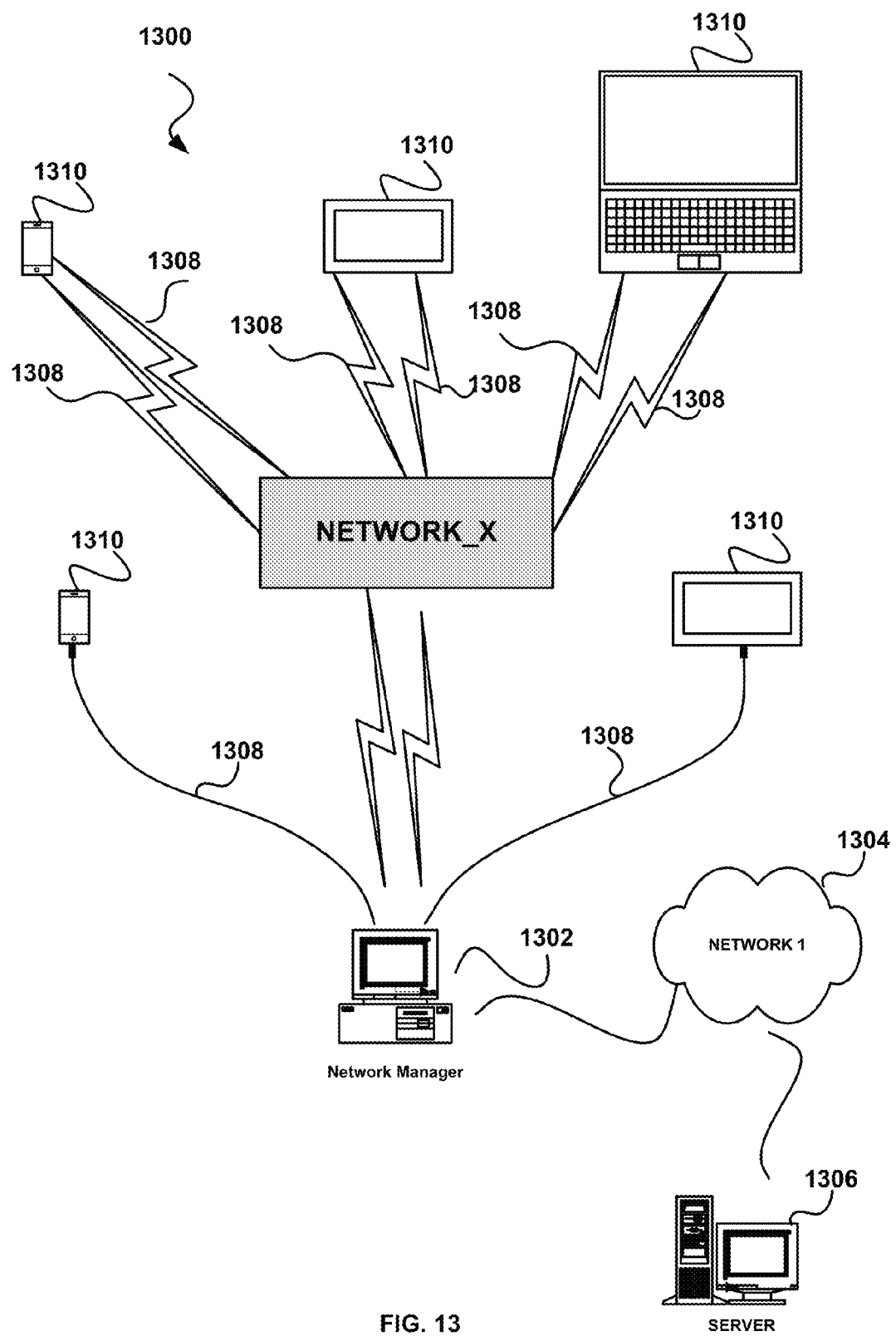
FIG. 13 shows a network architecture, in accordance with one possible embodiment.

FIG. 13 shows a network system 1300 for communication and distribution of data, in accordance with one embodiment. As an option, the network 1300 may be implemented in the context of the details of any of the Figures. However, such network system 1300 and others presented herein may be used in various applications and/or in permutations which may or may not be specifically described in the illustrative embodiments listed herein. Further, the network system 1300 presented herein may be used in any desired environment. Moreover, the aforementioned definitions may equally apply to the description below.

As shown, the network system 1300 includes one or more network managers 1302. In various embodiments, the one or more network managers may include the creator of the network, one or more servers, one or more devices on the network, and/or may arrange themselves in a form of hierarchy to establish controls and permissions on the network. For example, the network managers may adapt or manipulate the network and/or devices on the network in a manner consistent with what has been referenced above.

As shown, the network communication system 1300 may include one or more external networks 1304 and one or more servers 1306.

In one embodiment, the network manager on the network may have access to one or more other networks through wired or wireless connections (e.g., data, Bluetooth etc.) and may also have access to resources (e.g., servers, data files, etc.) outside the network. These, in another embodiment, may be shared or private or may be shared with the network and may operate in a manner consistent with what has been referenced above.

As shown, the network communication system 1300 may include one or more connections 1308 and one or more devices 1310.

In one embodiment, the connections to the established network may be wired and/or wireless for the one or more devices. Further, the connection to the network may operate in a manner consistent with what has been referenced above. For example, if the connection is wired or wireless the process for establishing connection to the network may operate the same with regards to permissions to connect, user interactions with the network, and resources distribution. In another embodiment, permissions may be allocated differently as established by the manager of the network based on the type of connection (e.g., wired, WiFi, Bluetooth, etc.).

Figure 14:
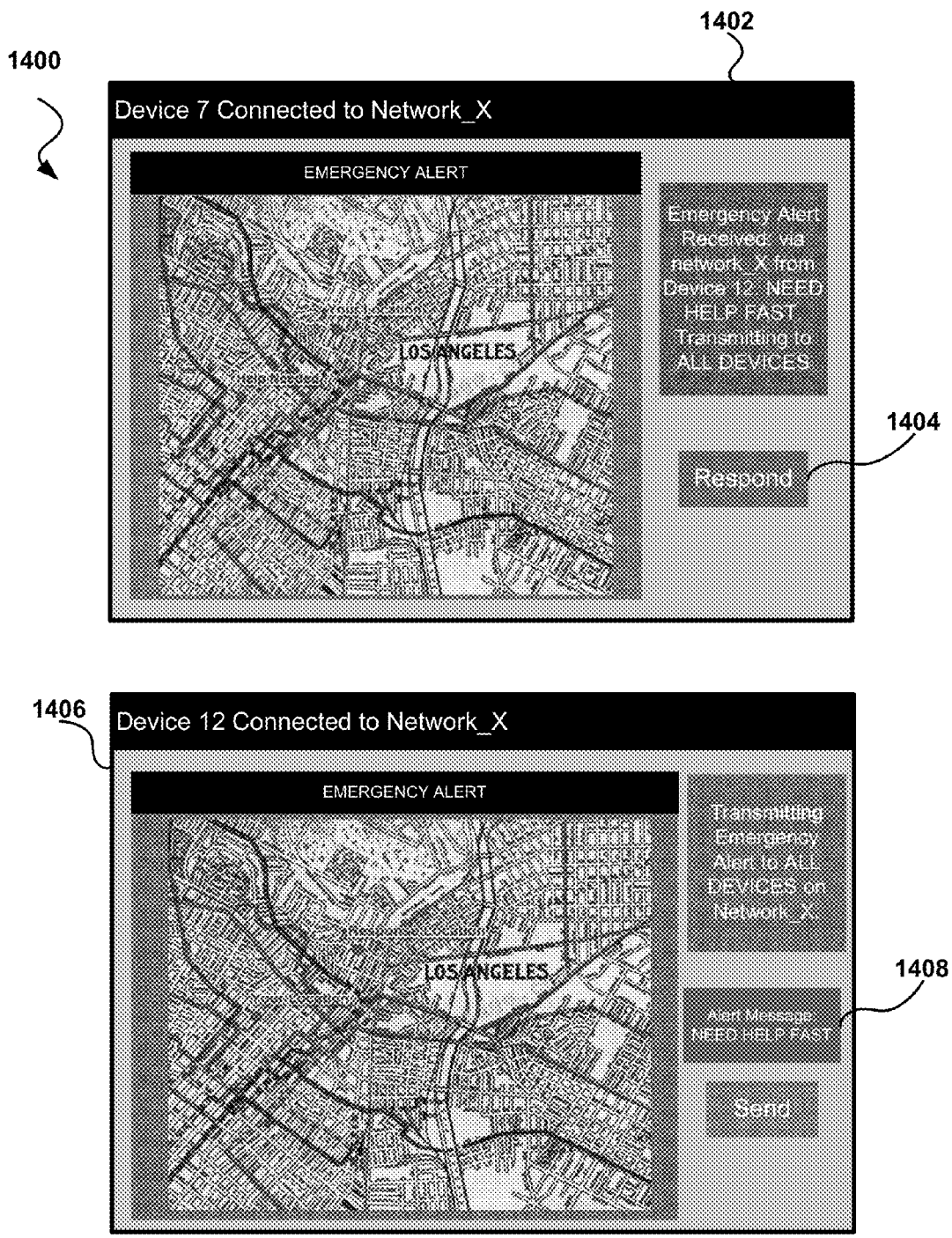
FIG. 14 shows user interface for managing a network system, in accordance with one embodiment.

FIG. 14 shows a user interface 1400 for interacting with network system, in accordance with one embodiment. As an option, the user interface 1400 may be implemented in the context of the details of any of the Figures. However, such user interface 1400 and others presented herein may be used in various applications and/or in permutations which may or may not be specifically described in the illustrative embodiments listed herein. Further, the user interface 1400 presented herein may be used in any desired environment. Moreover, the aforementioned definitions may equally apply to the description below.

As shown, the user interface 1400 includes one or more displays 1402 and one or more settings 1404. In various embodiments, as presented in the display 1402 and in a manner consistent with what has been referenced above, the network system may be implemented to send and respond to an emergency. For example, in various embodiments, an emergency signal may be transmitted through the network to one or more devices on the network. The one or more devices receiving the signal may, in another embodiment, respond to the request through the network system.

As shown, the user interface 1400 may include one or more displays 1406 and one or more settings 1408.

In one embodiment, the network may be used to send an emergency signal. In various embodiments, the user of one or more devices may create a signal and or message to be transmitted to the one or more other users on the network. Further, in another embodiment, the message and/or signal may include, but is not limited to, text, maps, locations, pictures, etc. and any other information as permitted by the network and inputted by the user of one or more devices.

Figure 15:
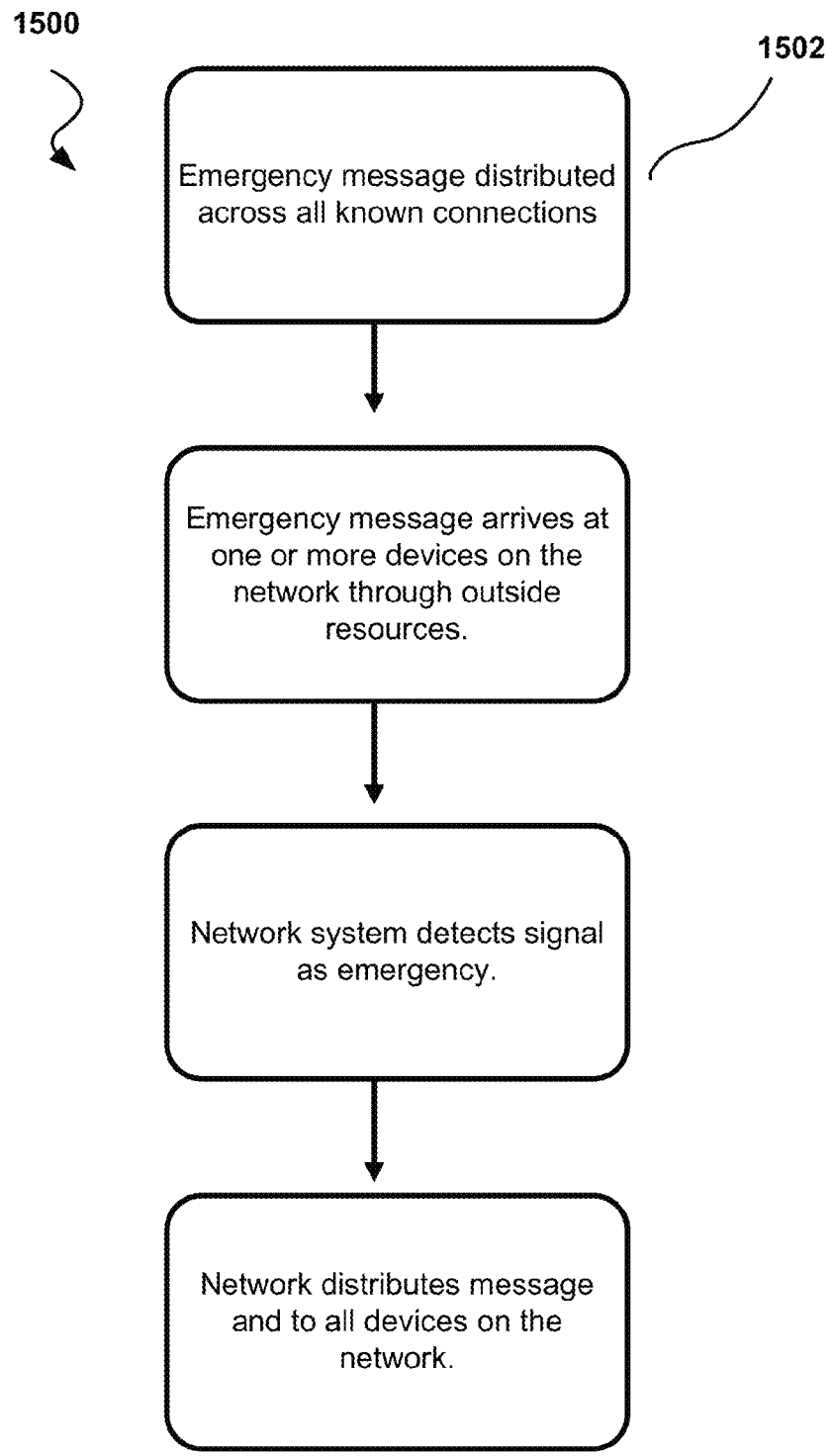
FIG. 15 shows a method managing a network system, in accordance with one possible embodiment.

Now referring to FIG. 15, a flowchart of a method 1500 for distributing a signal through a network is shown according to one embodiment. The method 1500 may be performed in accordance with the present invention in any of the environments depicted in FIGS. 1-14, among others, in various embodiments. Of course, more or less operations than those specifically described in FIG. 4 may be included in method 1500, as would be understood by one of skill in the art upon reading the present descriptions.

Each of the steps of the method 1500 may be performed by any suitable component of the operating environment. For example, in various embodiments, the method 1500 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1500. Illustrative processors include, but are not limited to, a central processing unit (CPU), an application specific integrated circuit (ASIC), a field programmable gate array (FPGA), etc., combinations thereof, or any other suitable computing device known in the art. Moreover, the aforementioned definitions may equally apply to the description below.

As shown, the flow chart 1500 includes one or more steps 1502. In various embodiments, the one or more steps may describe how an emergency signal may reach every device on the network even if not every device on the network has external resources available to them. For example, if one or more devices on the network has a resource available to it (e.g., data signal, internet connection etc.) and receives an emergency signal/message, the network may recognize that message as an emergency message and transmit it to one or more other devices on the network.

Figure 16:
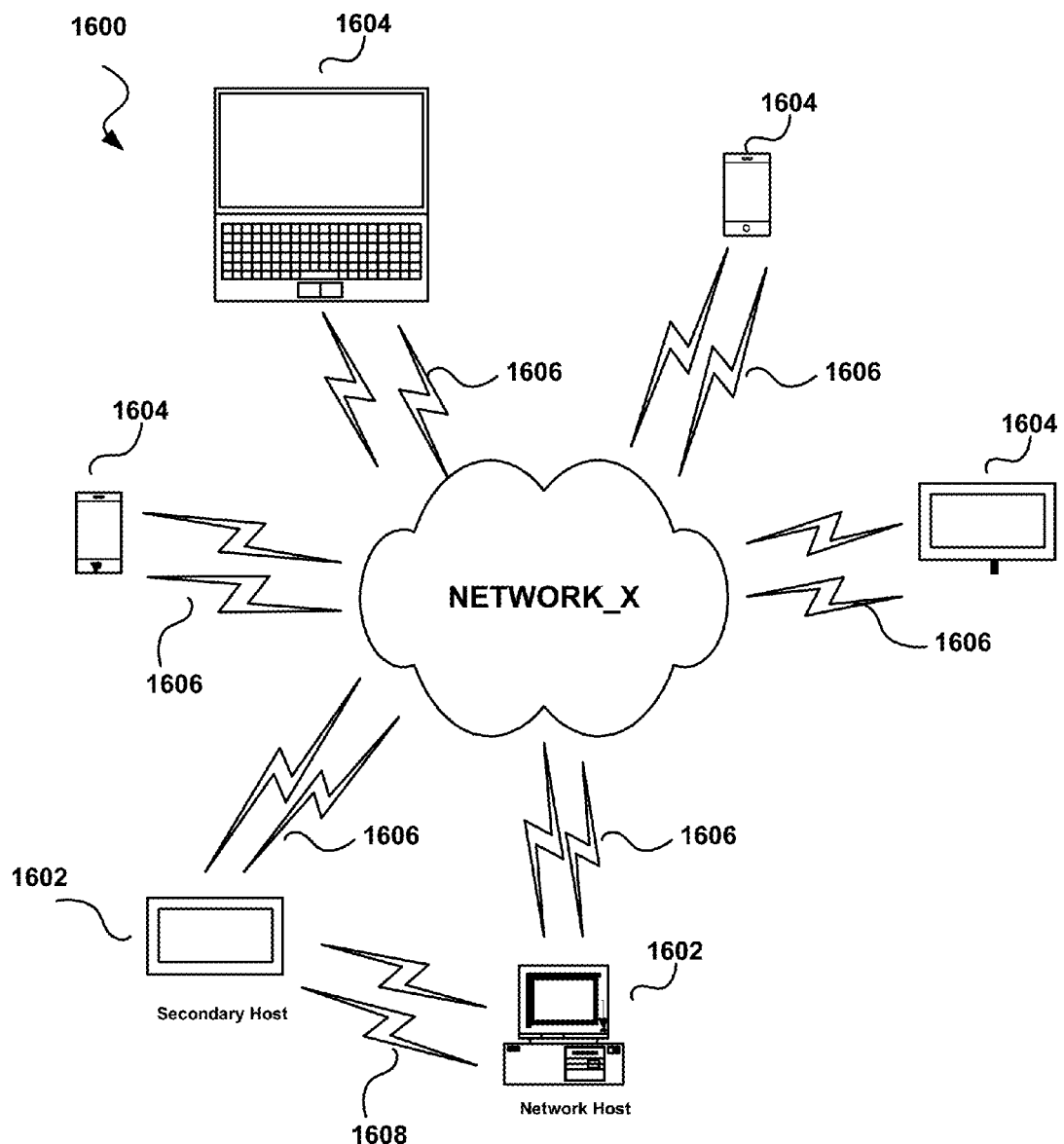
FIG. 16 shows a network architecture, in accordance with one possible embodiment.

FIG. 16 shows a network system 1600 for managing a network system, in accordance with one embodiment. As an option, the network system 1600 may be implemented in the context of the details of any of the Figures. However, such network system 1600 and others presented herein may be used in various applications and/or in permutations which may or may not be specifically described in the illustrative embodiments listed herein. Further, the network system 1600 presented herein may be used in any desired environment. Moreover, the aforementioned definitions may equally apply to the description below.

As shown, the network system 1600 includes one or more network hosts 1602. In various embodiments, the one or more network hosts may control, alter, and manipulate the network. Further, the one or more network hosts may or may not share some or all of the properties of the network.

As shown, the network system 1600 may contain one or more devices 1604 and one or more connections 1606.

In one embodiment, the one or more network hosts may be connected to the network and the other devices on the network through a wired or a wireless connection.

Further, in another embodiment, not connection or resource may be needed outside of the devices connected in order to establish a connection. For example, in various embodiments, the one or more network hosts may establish a network without first establishing a connection to another network and/or system. In addition, in another embodiment, the one or more hosts on the network may be the devices directly connected to the one or more other devices on the network therefor establishing and maintaining the network independent of devices and/or resources outside of the network.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
    code configured to establish a network;
    code configured to connect a plurality of devices to the network, where:
        the plurality of devices are limited to a predetermined number within the network,
        each of the plurality of devices are connected to the network only if they contribute to enhancing the network with hardware resources of the device,
        one or more of the plurality of devices are allowed to remain on the network at least as long as they continue to contribute to the network,
        each of the plurality of devices are denied access to another network, and
        the network is visible only to the plurality of devices, where each of the plurality of devices are specifically designed such that they are tuned to detect signals at a specific frequency used by the network, where other devices outside the network cannot detect the network;
    code configured to receive feedback from one or more of the plurality of devices; and
    code configured to manage the network based on the feedback from one or more of the plurality of devices, including:
        identifying one of the plurality of devices as a master device, and
        pushing content from the master device to the plurality of devices other than the master device.

2. The computer program product of claim 1, wherein one or more devices on the network connect to a separate cellular network in order to increase an efficiency of the network.

3. The computer program product of claim 1, wherein the network is established utilizing a wireless connection.

4. The computer program product of claim 1, wherein each of the plurality of devices is a mobile device.

5. The computer program product of claim 1, wherein the network is established automatically when the plurality of devices are detected within a predetermined range of each other.

6. The computer program product of claim 1, wherein managing the network includes re-designating at least one of a slave device as a second master device, and the master device as a second slave device.

7. The computer program product of claim 1, wherein the feedback includes information and/or commands corresponding to the plurality of devices.

8. A method, comprising:
    establishing a network;
    connecting a plurality of devices to the network, where:
        the plurality of devices are limited to a predetermined number within the network,
        each of the plurality of devices are connected to the network only if they contribute to enhancing the network with hardware resources of the device, one or more of the plurality of devices are allowed to remain on the network at least as long as they continue to contribute to the network,
each of the plurality of devices are denied access to another network, and
the network is visible only to the plurality of devices, where each of the plurality of devices are specifically designed such that they are tuned to detect signals at a specific frequency used by the network, where other devices outside the network cannot detect the network;
receiving feedback from one or more of the plurality of devices; and
managing the network based on the feedback from one or more of the plurality of devices, including:
identifying one of the plurality of devices as a master device, and
pushing content from the master device to the plurality of devices other than the master device.

9. The method of claim 8, wherein managing the network further includes adjusting settings associated with one or more of the network and the connection of one or more of the plurality of devices to the network.

10. The method of claim 8, wherein the network is established utilizing a wireless connection.

11. The method of claim 8, wherein each of the plurality of devices is a mobile device.

12. The method of claim 8, further comprising:
designating at least one of the plurality of devices as the master device; and
designating at least one of the plurality of devices as a slave device, wherein the master device has control over the slave device.

13. The method of claim 12, wherein the master device has control over at least a portion of the network.

14. The method of claim 12, wherein managing the network further includes re-designating at least one of the slave device as a second master device, and the master device as a second slave device.

15. The method of claim 8, wherein the feedback includes information and/or commands corresponding to the plurality of devices.

16. A system comprising:
a memory system; and
a processing circuit coupled to the memory system and configured to:
establish, by the processing circuit, a network;
connect, by the processing circuit, a plurality of devices to the network, where:
the plurality of devices are limited to a predetermined number within the network,
each of the plurality of devices are connected to the network only if they contribute to enhancing the network with hardware resources of the device,
one or more of the plurality of devices are allowed to remain on the network at least as long as they continue to contribute to the network,
each of the plurality of devices are denied access to another network, and
the network is visible only to the plurality of devices, where each of the plurality of devices are specifically designed such that they are tuned to detect signals at a specific frequency used by the network, where other devices outside the network cannot detect the network;
receive, by the processing circuit, feedback from one or more of the plurality of devices; and
manage, by the processing circuit, the network based on the feedback from one or more of the plurality of devices, including:
identifying one of the plurality of devices as a master device, and
pushing content from the master device to the plurality of devices other than the master device.

17. The system of claim 16, wherein the network is established utilizing a wireless connection, and each of the plurality of devices is a mobile device.

18. The system of claim 16, further comprising:
designating at least one of the plurality of devices as the master device; and
designating at least one of the plurality of devices as a slave device, wherein the master device has control over the slave device, wherein the master device has control over at least a portion of the network, wherein managing the network includes re-designating at least one of the slave device as a second master device, and the master device as a second slave device.

19. The system of claim 16, wherein the feedback includes information and/or commands corresponding to the plurality of devices.

20. A method, comprising:
establishing a network;
connecting a plurality of mobile devices to the network, where:
the plurality of mobile devices are limited to a predetermined number within the network,
each of the plurality of mobile devices are connected to the network only if they contribute to enhancing the network with hardware resources of the device,
one or more of the plurality of devices are allowed to remain on the network at least as long as they continue to contribute to the network,
each of the plurality of mobile devices are denied access to another network, and
the network is visible only to the plurality of mobile devices, where each of the plurality of mobile devices are specifically designed such that they are tuned to detect signals at a specific frequency used by the network, where other devices outside the network cannot detect the network;
receiving feedback from one or more of the plurality of mobile devices; and
managing the network based on the feedback from the one or more mobile devices, including:
identifying one of the plurality of mobile devices as a master device, and
pushing content from the master device to the plurality of mobile devices other than the master device.

21. A method, comprising:
establishing a network utilizing a wireless connection;
connecting a plurality of devices to the network, where:
the plurality of devices are limited to a predetermined number within the network,
each of the plurality of devices are connected to the network only if they contribute to enhancing the network with hardware resources of the device,
one or more of the plurality of devices are allowed to remain on the network at least as long as they continue to contribute to the network,
each of the plurality of devices are denied access to another network, and
the network is visible only to the plurality of devices, where each of the plurality of devices are specifically designed such that they are tuned to detect signals at a specific frequency used by the network, where other devices outside the network cannot detect the network;

receiving feedback from one or more of the plurality of devices; and managing the network based on the feedback from one or more of the plurality of devices, including:

identifying one of the plurality of devices as a master device, and pushing content from the master device to the plurality of devices other than the master device.

22. A method, comprising:

establishing a network;

connecting a plurality of devices to the network, where:

the plurality of devices are limited to a predetermined number within the network, each of the plurality of devices are connected to the network only if they contribute to enhancing the network with hardware resources of the device, one or more of the plurality of devices are allowed to remain on the network at least as long as they continue to contribute to the network, each of the plurality of devices are denied access to another network, and the network is visible only to the plurality of devices, where each of the plurality of devices are specifically designed such that they are tuned to detect signals at a specific frequency used by the network, where other devices outside the network cannot detect the network;

receiving feedback from one or more of the plurality of devices, the feedback including commands corresponding to the plurality of devices; and managing the network based on the feedback from one or more of the plurality of devices, including:

identifying one of the plurality of devices as a master device, and pushing content from the master device to the plurality of devices other than the master device.

\* \* \* \* \*